(12) United States Patent
Nomura et al.

(10) Patent No.: US 8,045,857 B2
(45) Date of Patent: Oct. 25, 2011

(54) OPTICAL SWITCHING DEVICE, OPTICAL ACCESS NETWORK, OPTICAL SWITCHING METHOD, PROGRAM, AND RECORDING MEDIUM

(75) Inventors: Takumi Nomura, Tokyo (JP); Hiromi Ueda, Tokyo (JP); Kunitetsu Makino, Kanagawa (JP); Hiroaki Kurokawa, Tokyo (JP); Toshinori Tsuboi, Tokyo (JP); Hiroyuki Kasai, Tokyo (JP); Hirokazu Kobayashi, Kanagawa (JP)

(73) Assignee: NEC Communications Systems, Ltd., Tokyo (JP)

( * ) Notice: Subject to any disclaimer, the term of this patent is extended or adjusted under 35 U.S.C. 154(b) by 867 days.

(21) Appl. No.: 11/640,951

(22) Filed: Dec. 19, 2006

(65) Prior Publication Data
US 2007/0172236 A1 Jul. 26, 2007

(30) Foreign Application Priority Data
Dec. 20, 2005 (JP) ................................. 2005-367178

(51) Int. Cl.
*H04B 10/02* (2006.01)
(52) U.S. Cl. .......................................... 398/66; 398/173
(58) Field of Classification Search ............... 398/43, 398/45, 48, 118, 176, 58, 66–68, 70–72, 398/173, 175; 375/375, 376, 374
See application file for complete search history.

(56) References Cited

U.S. PATENT DOCUMENTS

| | | | | | |
|---|---|---|---|---|---|
| 4,747,094 | A | * | 5/1988 | Sakaguchi et al. | 398/101 |
| 5,296,957 | A | * | 3/1994 | Takahashi et al. | 398/177 |
| 6,625,340 | B1 | * | 9/2003 | Sparks et al. | 385/18 |
| 6,813,407 | B2 | * | 11/2004 | Ramaswami et al. | 385/16 |
| 7,020,401 | B2 | * | 3/2006 | Sakano et al. | 398/175 |

FOREIGN PATENT DOCUMENTS

| | | |
|---|---|---|
| JP | 61-67398 | 4/1986 |
| JP | 7-177098 | 7/1995 |

OTHER PUBLICATIONS

IEEE802.3ah™ //D.3.3, "Carrier Sense Multiple Access with Collision Detection (CSMA/CD) access method and physical layer specifications" Sep. 7, 2004.

(Continued)

*Primary Examiner* — Dalzid Singh
(74) *Attorney, Agent, or Firm* — Young & Thompson

(57) ABSTRACT

In an optical access network using an optical switching device, a 2×1 optical splitter in the uplink and downlink directions is eliminated to extend the transmission distance between the OLT and the ONU. An optical switching device includes a downlink optical switch element for switching a downlink optical signal sent by an OLT, an uplink optical switch element for switching an uplink optical signal sent by a plurality of ONU, an O/E for converting a downlink optical signal to a first electrical signal, an E/O for converting the first electrical signal to a downlink optical signal and inputting the downlink optical signal to the downlink optical element, an O/E for converting an uplink optical signal output from the uplink optical switch element to a second electrical signal, and an E/O for converting the second electrical signal to an uplink optical signal and sending the uplink optical signal to the OLT.

22 Claims, 10 Drawing Sheets

OTHER PUBLICATIONS

H. Ueda et al., "Proposed New Optical Access Network Architecture—Access Networks with Optical Packet Switching", IEICE technical report CS2004-253 (Mar. 2005).

T. Nomura et al., "Architecture of optical switching module in new optical access network", IEICE technical report CS2004-254 (Mar. 2005).

Japanese Official Action—2005-367178—Jan. 7, 2011.

Chinese Office Action issued Jan. 17, 2011 in corresponding Chinese Application No. 200610064330.2 with English translation of Chinese Examiner's comments in Office Action.

* cited by examiner

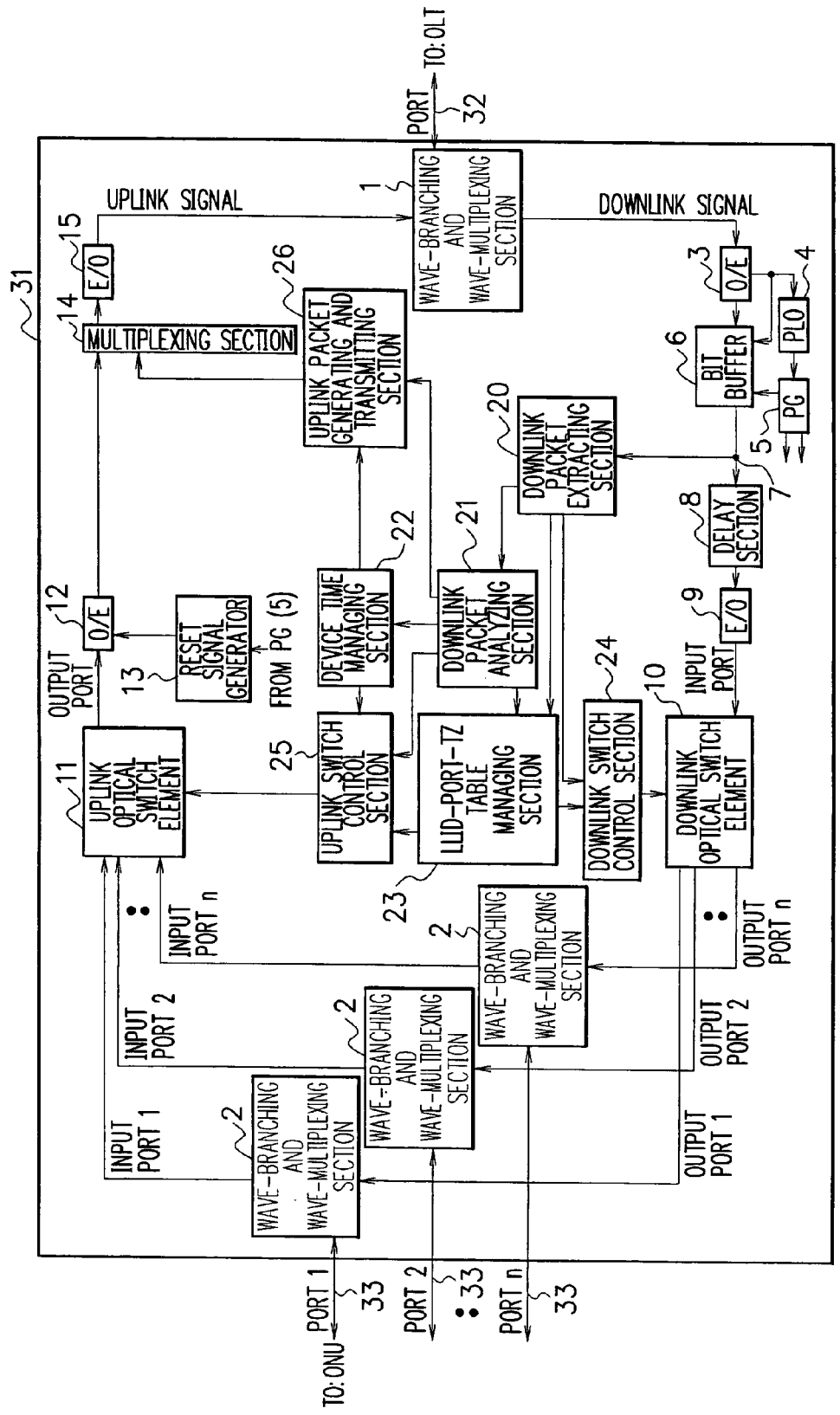
F I G. 5

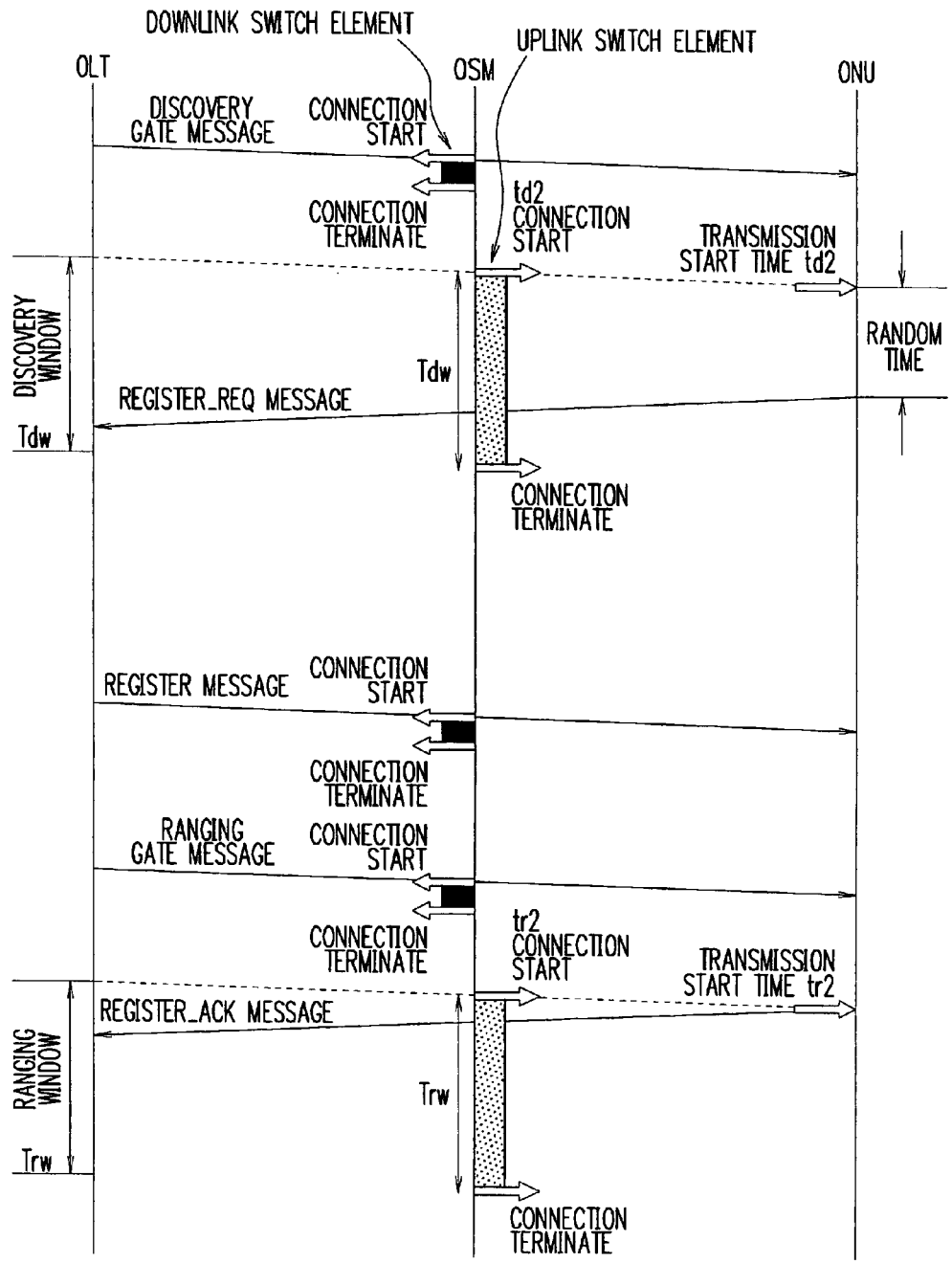

OPTICAL SWITCHING DEVICE, OPTICAL ACCESS NETWORK, OPTICAL SWITCHING METHOD, PROGRAM, AND RECORDING MEDIUM

BACKGROUND OF THE INVENTION

1. Field of the Invention

The present invention relates to a configuration of an optical switching device used in an optical access network. The present invention relates to a technique that eliminates a 1×2 splitter, which has been needed in an optical switching device, and reduces insertion loss of the optical switching device. Further, the present invention relates to a technique that compensates the loss between an optical switching device (OSM (Optical Switching Module)) and a center device (OLT (Optical Line Unit)), and extends the transmission distance between the center device and a remote device (ONU (Optical Network Unit)). The present invention also relates to a technique that achieves with extremely high accuracy the delay, which is required for downlink switching, at an electrical level instead of the conventional optical level.

2. Description of the Related Art

Japanese Patent Application Laid-Open No. 7-177098 (patent document 1) discloses a technique related to an optical access network configured into a tree-shape with one center device (OLT), a plurality of remote devices (ONU), and one optical switch connected between the OLT and an ONU.

In patent document 1, a time slot with a fixed length acts as a unit of switching. The ports are periodically connected in the downlink direction. In the uplink direction, transmission is performed after providing a delay time so that all the ONUs have a maximum delay time and the ports are periodically connected.

IEEE802.3ah™/D.3.3, "Carrier Sense Multiple Access with Collision Detection (CSMA/CD) access method and physical layer specifications," Sep. 7, 2004 (non-patent document 1) discloses a technique related to an optical access network forming a tree-shape with one center device (OLT), a plurality of remote devices (ONU), and at least one optical splitter connected between the OLT and the ONU.

Generally, such optical network is referred to as PON (Passive Optical Network), and in particular, the PON described in non-patent document 1 is called E-PON since Ethernet (registered trademark) frame is used, or GE-POM since the speed on the transmission path is gigabits.

An optical access network forming a tree-shape with one center device (OLT), a plurality of remote devices (ONU), and at least one optical switching device (OSM) connected between the OLT and the ONU is disclosed in Hiromi Ueda, Takumi Nomura, Kunitetsu Makino, Yoshinori Tsuboi, Hiroaki Kurokawa, and Hiroyuki Kasai, "Proposed New Optical Access Network Architecture-Access Networks with Optical Packet Switching", IEICE technical report CS2004-253 (2005-03) (non-patent document 2) and Takumi Nomura, Chikashi Itoh, Hiroaki Kurokawa, Hiromi Ueda, Toshinori Tsuboi, and Hiroyuki Kasai, "Architecture of optical switching module in new optical access network", IEICE technical report CS2004-254 (2005-03) (non-patent document 3).

A conventional OSM described in non-patent documents 2 and 3 is shown in FIG. 1. The OSM 31 includes a downlink optical switch element 10 having one input port and n output ports, and an uplink switch element 11 having n input ports and one output port. The input port of the downlink optical switch element 10 and one output port of the optical switch element 11 become one port of the OSM 31 by wavelength multiplexing, and are connected to the OLT through one optical fiber. Furthermore, output port k (k=1, 2, 3, ..., n) of the element 10 and input port k (k=1, 2, 3, ..., n) of the element 11 become port k (k=1, 2, 3, ..., n) of the OSM 31 by wavelength multiplexing, and is connected to an ONU through one optical fiber.

The control of switching of the element 10 and the element 11 of the OSM 31 is performed with a signal that is divided by the 1×2 splitter (an optical splitter 60) and converted to an electrical signal. The 1×2 splitter is disposed before the input port of the element 10 and divides an electrical signal from the center device. The other optical signal is input to the element 10. The 1×2 splitter (optical splitter 60) is also arranged next to the output port of the element 11 so that packets can be transmitted from the OSM 31 to the OLT.

For more detail, the switching of the downlink optical switch element 10 of the OSM 31 is performed with an LLID (Logical Link Identifier), which is the identification number of an ONU, and the packet length. The LLID and the packet length are included in a packet obtained from the electrical signal that is converted from the optical signal of the center device (OLT). The switching of the uplink optical switch element 11 is performed with an LLID of the ONU of the destination, the transmission start time and the transmission duration of the ONU. The LLID, the transmission start time and the transmission duration are included in the GATE message obtained from the electrical signal converted from the optical signal of the center device (OLT). An output port of the element 10 and an input port of the element 11 (the port selection of the OSM 31 on the ONU side) are selected based on the LLID. As described above, the 1×2 splitters are arranged both in the downlink direction and in the uplink direction.

Among the content of non-patent document 1, the packet configuration, the transmission control of an OLT over an ONU, and the discovery operation of the OLT over the ONU will be described below. The term "packet" is consistently used herein but the content of explanation will not change even if the term "frame" is used.

The packet configuration is shown in FIG. 2. A packet mainly includes a preamble section, a MAC (Media Access Control) header section, a payload section, and an error detecting section FCS (Frame Check Sequence).

The preamble section includes a code 0×55 (01010101) for achieving bit synchronization, an LLID corresponding to the identification number of an ONU, a code 0×d5 (11010101) called SLD (Start of LLID Delimiter) for detecting an LLID, and a CRC (Cyclic Redundancy Check) for detecting bit error of the SLD and the LLID.

The MAC header section includes a destination MAC address (DA: Destination Address), a source MAC address (SA: Source Address), and length/type (L/T).

The payload section contains data of a user and data for the control of the network. There are defined five types of packets for the control of the network: namely, GATE message, REGISTER_REQ message, REGISTER message, REGISTER_ACK message and REPORT message. A time stamp is defined commonly for these messages.

The GATE message is used in the transmission control for an ONU. In the payload section of the GATE message, information such as an identification number (Opcode) of the GATE message, the time information (Time Stamp)) for distributing the time of the OLT, a discovery flag indicating whether the packet is for a discovery operation, a transmission start time (Grant Start Time) of the ONU, a transmission duration (Grant Length) of the ONU and so on are written.

The discovery operation is that an OLT provides an LLID to an ONU when a new ONU is connected or when the power of the ONU is turned on after the power is once turned off, and then a round-trip time between the ONU and the OLT is measured for the first time. The discovery operation is periodically performed to enable the provision of the LLID and the measurement of the round-trip time even if a new ONU is connected or the power of the ONU is turned off and then again turned on. The interval is determined by a system designer.

The discovery operation is shown in FIG. 3. The GATE message is transmitted from the OLT at the beginning of the discovery operation. This GATE message targets the ONU to which LLID is not given, where the LLID used therefor is that defined for broadcasting. Furthermore, the discovery flag is set to "1" and the multicast is used for the destination MAC address. Such GATE message is hereinafter referred to as "discovery GATE message".

In the PON (Passive Optical Network), the discovery GATE message transmitted from the OLT is branched by an optical splitter, and reaches all ONUs connected to the splitter. When unregistered ONUs that are not yet given an LLID receive the discovery GATE message, they all at once transmit REGISTER_REQ message to request for registration to the OLT. In order to avoid the REGISTER_REQ messages from colliding in the interval between the optical splitter and the OLT, each unregistered ONU waits for a random time starting from the transmissions start time td2 written on the discovery GATE message, and then transmits the REGISTER_REQ message having the destination MAC address be the MAC address of the ONU.

When the OLT receives an REGISTER_REQ message, the OLT acquires the MAC address of the ONU from the REGISTER_REQ message, newly assigns an LLID, and manages the relationship between the MAC address of the ONU and the LLID. The OLT transmits the REGISTER message with the LLID written in the information region (payload region) of the packet to notify the ONU of the LLID assigned to the ONU. The ONU receives the message and obtains the LLID, and thereafter, the ONU transmits packets with the LLID given to the preamble section of a packet. The ONU also determines whether the packet sent from the OLT is for itself based on the LLID in the preamble section. If the LLID in the preamble section and the LLID written in the data region of the REGISTER message must be specifically distinguished, the latter will be described as LLID_Reg.

Subsequently, the OLT specifies the ONU with the LLID, and the GATE message with the transmitting MAC address being "multicast" and the discovery flag being 0 is transmitted to measure the round-trip time (called ranging). Such GATE message is hereinafter referred to as "ranging GATE message". After receiving the ranging GATE message, the ONU corresponding to the LLID acquires the time information (Time Stamp) tr1, the transmitting start time (Grant Start Time) tr2, and the transmitting duration (Grant Length) Tr2 written on the ranging GATE message, sets the time information tr1 for the clock of the ONU, and starts transmitting the REGISTER_ACK message at the transmitting start time tr2 of the clock to the OLT and continues it for the transmitting duration Tr2. It should be noted that tr2, written on the time information (Time Stamp) of the REGISTER_ACK message, is defined by the clock of the ONU. If the OLT receives the REGISTER_ACK message at time tr3 at its clock, the round-trip time RTTa between the OLT and the ONU can be obtained from tr2 written on the relevant message with RTTa=tr3−tr2. The measurement of the round-trip time is performed by the OLT and the registration of the ONU is completed.

In order to perform the transmission control of the ONU whose registration is completed, the OLT gives the corresponding LLID to the ONU, and uses the GATE message with the transmitting MAC address being the MAC address of the ONU and the discovery flag being 0. Such GATE message is hereinafter referred to as "transmission control GATE message". The OLT investigates the transmission request of the ONU based on the REPORT message requested by the transmission control GATE message. Simultaneously, the OLT measures the round-trip time RTTa=t3−t2 with the transmission start time t2 written on the transmission control GATE message and the arrival time t3 of the REPORT message, and updates the measured time.

However, the above-described conventional examples have the following problems.

In the optical access network configured into a tree-shape with one center device (OLT), a plurality of remote devices (ONU), and at least one optical switching device (OSM) connected between the OLT and an ONU, the transmission distance between the OLT and the ONU is determined by the insertion loss of the OSM.

However, the 2×1 optical splitters (an optical splitter 60) are used in the downlink and uplink direction in the conventional OSM as shown in FIG. 1. The insertion loss of the 2×1 optical splitter is about 4 dB. This is added to the insertion loss of the OSM 31, and thus the insertion loss cannot be made lower than 4 dB in the entire OSM 31 even if the insertion loss of the elements 10 and 11 is reduced. Since the loss of the 1310 nm band single mode fiber used in the optical access network is about 0.34 dB/km, 4 dB is equivalent to 11.8 km. If the 2×1 optical splitter is removed from the OSM 31, the transmission distance between the OLT and the ONU can be extended by 11.8 km.

Furthermore, the delay section 51 of FIG. 1 can be realized by adjusting the optical level, for example, the length of the optical fiber, but the delay section 51 requires adjustment of nanosecond order, which is not always easy.

SUMMARY OF THE INVENTION

In view of the above, the present invention aims to extend the transmission distance between the OLT and the ONU in the optical access network using the optical switching device and to remove 2×1 optical splitters in the uplink and downlink direction. The present invention also aims to electrically realize the delay necessary in an optical switch in the downlink direction at high precision.

In order to solve the above problem, the present embodiments provide an optical switching device of an optical access network configured into a tree-shape by one center device (OLT), a plurality of remote devices (ONU), and at least one optical switching device (OSM) connected between the OLT and ONUs, wherein an optical signal is converted to an electrical signal before the input port of a downlink switch element, and the electrical signal is split into two signals, where one electrical signal is used for switching control of the downlink and uplink optical switch elements, and the other electrical signal is converted to an optical signal and input to the downlink optical switch element. The optical signal is converted to an electrical signal after the output port of the uplink switch element, and then the converted electrical signal and an electrical signal transmitted from the optical switching device to the center device are multiplexed and then converted to an optical signal.

With above manner, the optical switching device (OSM) is provided in which a 1×2 optical splitter is omitted, and the delay needed before the downlink switch element is electrically achieved.

Another aspect of the present embodiments is to provide an optical switching device of an optical access network configured into a tree-shape with one center device (OLT), a plurality of remote devices (ONU), and at least one optical switching device (OSM) connected between the OLT and ONUs, where when a discovery GATE message is detected, the input port and one output port k (k=1, 2, ..., n) among the n output ports of a downlink optical switch element including one input port and n output port are connected, one input port k (k=1, 2, ..., n) among the n input ports and the output port of an uplink optical switch element including n input ports and one output port are connected. And when a REGISTER message is detected from the OLT, an LLID (LLID_Reg) of the remote device written on a REGISTER message is acquired, and the relationship between the LLID of an ONU and the remote device side port k is defined.

According to the present embodiments, the loss of about 4dB is reduced both in the downlink direction and in the uplink direction. Furthermore, the loss of the optical fiber between the OLT and the OSM vanishes since the optical signal from the center device side (OLT) is reproduced in the optical switching device (OSM). Therefore, the transmission distance between an OLT and an ONU in the optical access network using the optical switching device is greatly extended. Furthermore, the delay necessary before the downlink switch element is electrically achieved at high precision.

BRIEF DESCRIPTION OF THE DRAWINGS

FIG. 5 is a schematic configuration diagram of an optical switching device (OSM) according to a second embodiment;

FIG. 10 is a sequence diagram showing a connection start time and connection terminating time in a discovery operation of the optical switching device (OSM) according to the first to sixth embodiments;

DETAILED DESCRIPTION OF THE PREFERRED EMBODIMENTS

Figure 1:
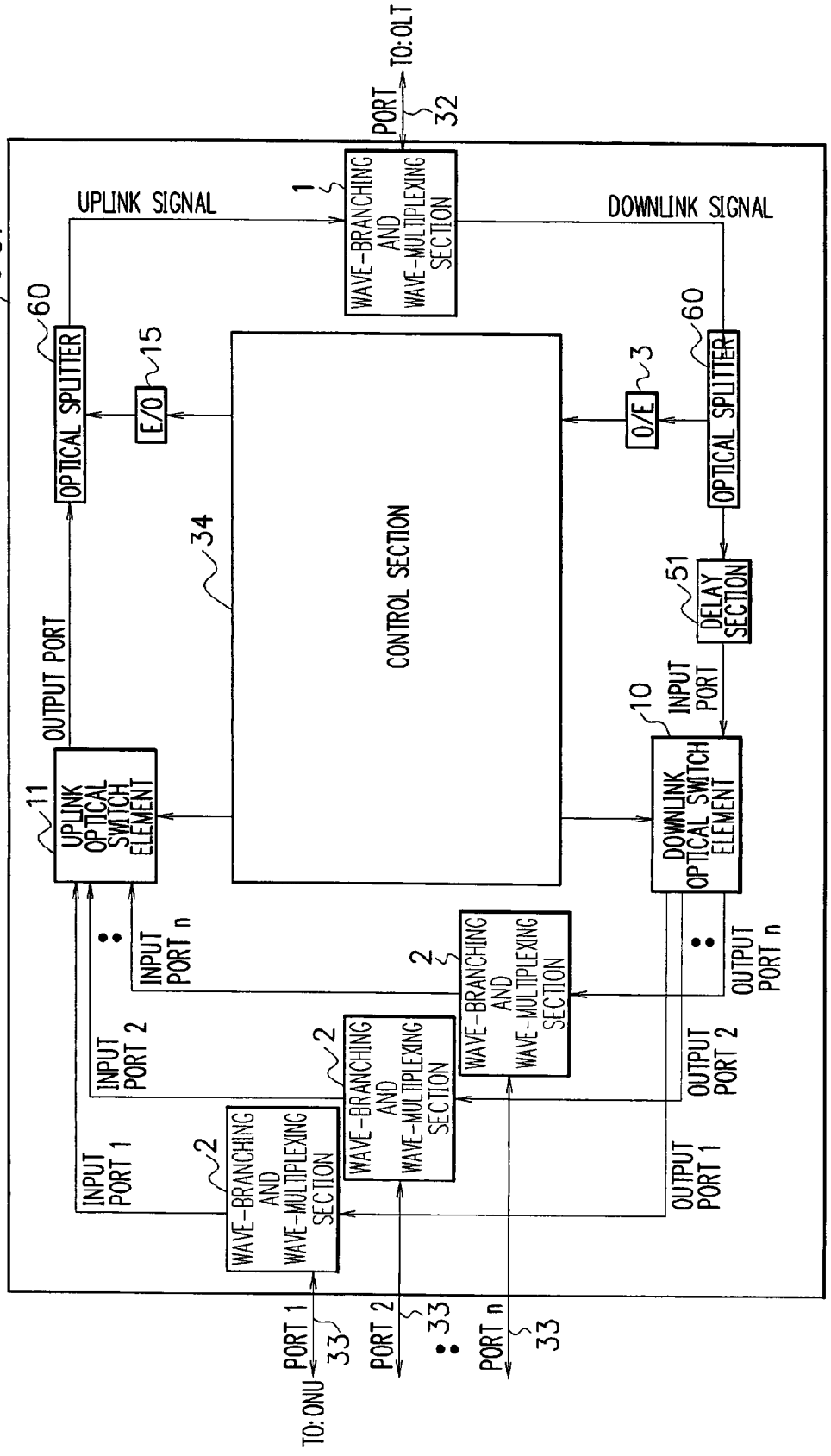
FIG. 1 is a schematic configuration diagram of a conventional optical switching device (OSM)
Figure 2:
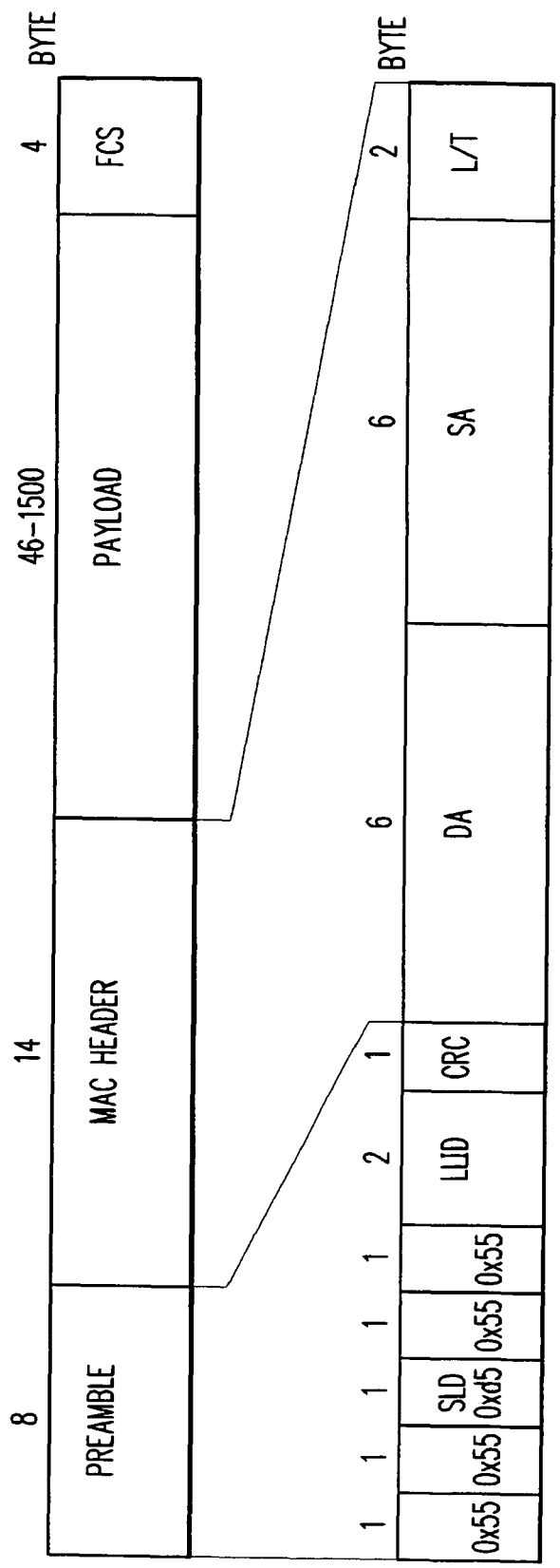
FIG. 2 is a diagram showing a conventional packet configuration.
Figure 3:
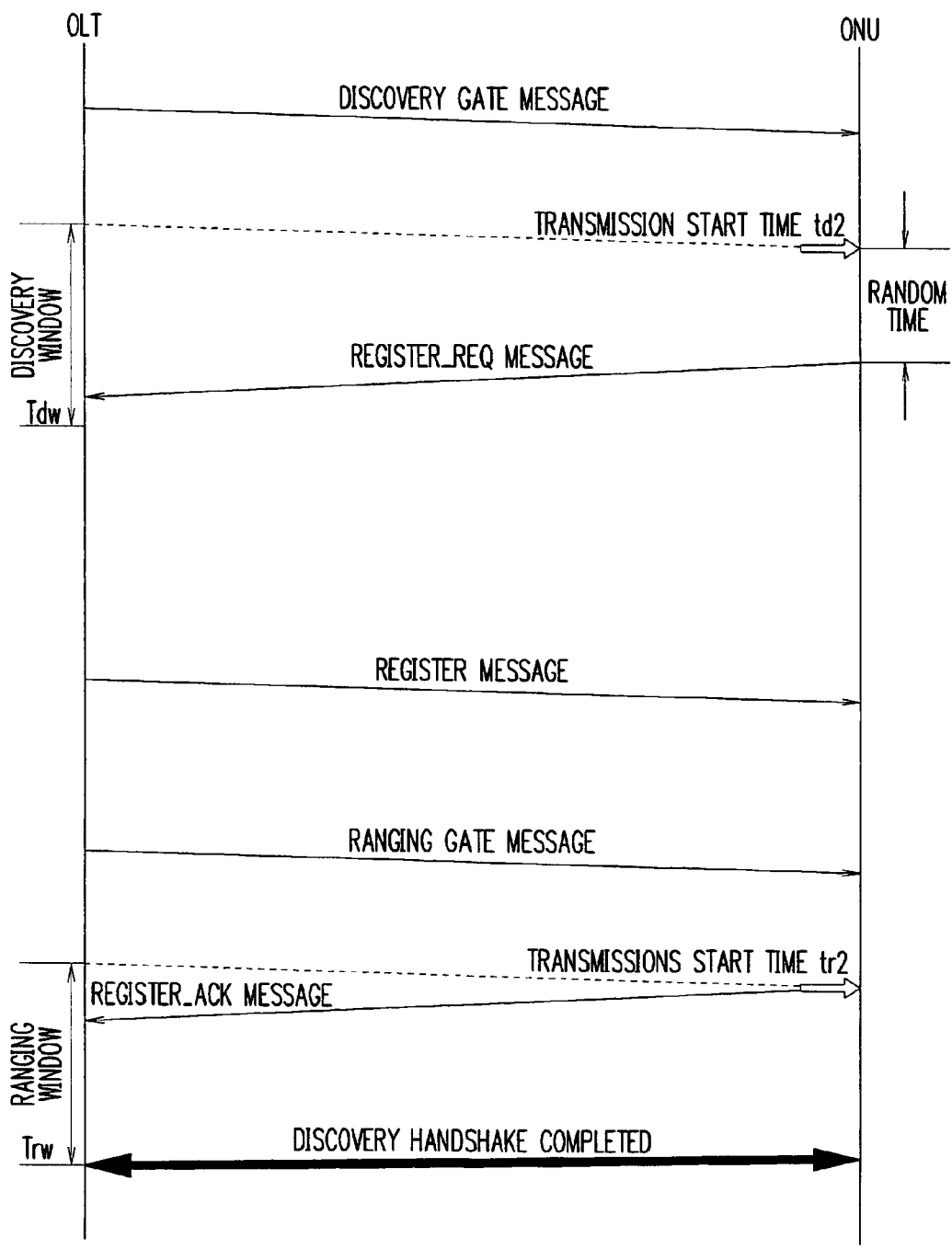
FIG. 3 is a sequence diagram showing a conventional discovery operation.

The embodiments of the present invention will be described below in detail with reference to the drawings. Same reference characters are denoted for components common through the figures.

First Embodiment

Figure 4:
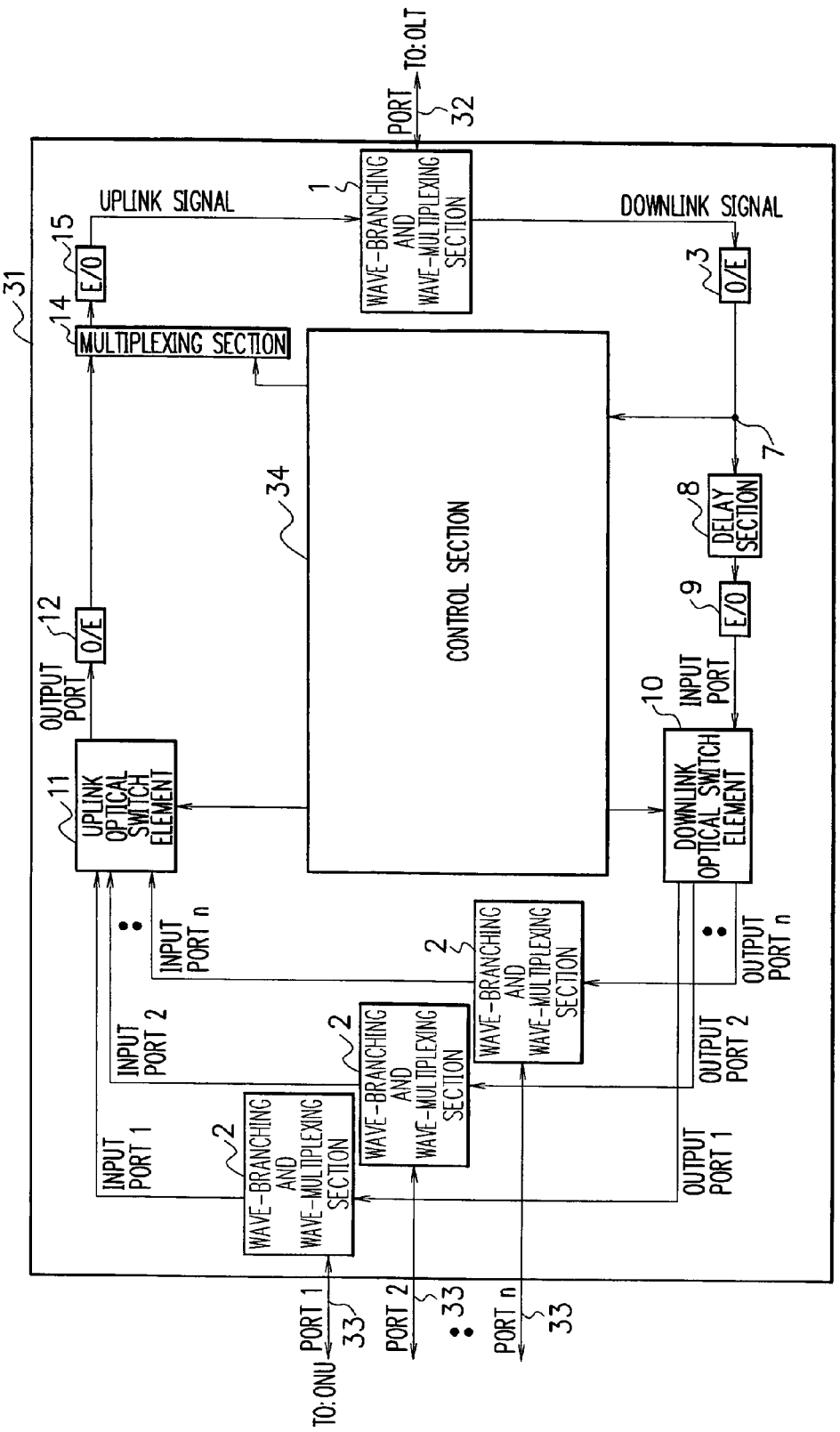
FIG. 4 is a schematic configuration diagram of an optical switching device (OSM) according to a first embodiment.

An optical switching device (OSM) according to a first embodiment will be described below with reference to FIG. 4.

The optical switching device (OSM) 31 includes one input/output port connected to the OLT through an optical fiber 32 and n input/output ports connected to n ONUs through optical fibers 33. The input port of a downlink optical switch element 10 and the output port of an uplink optical switch element 11 in the OSM correspond to the port on the OLT side of the OSM 31. Output ports (=n) of the element 10 and n input ports of the element 11 in the OSM correspond to the ports on the ONU side of the OSM 31. The present embodiment has features that optical splitters for branching the optical signal is not included, the loss is small, and a delay section 8 is electrically achieved with high precision. When a CPU (Central Processing Unit) for performing a central processing control of the OSM 31 is used in the OSM 31, mounted are the CPU and ROM (Read Only Memory), a recording medium, for storing a program that is read out when the CPU performs the central processing control. Other embodiments also share this feature.

A wave-branching and wave-multiplexing section 1 wave-branches the wavelength of the downlink optical signal transmitted from the OLT through the optical fiber 32, and inputs the downlink optical signal to an optical/electrical conversion section 3. The section 1 wave-multiplexes uplink optical signals from an electrical/optical conversion section (E/O) 15 and inputs an uplink optical signal to the optical fiber 32 connected to the OLT.

There are n wave-branching and wave-multiplexing sections 2 that are connected to n ONUs through the optical fibers 33. A wave-branching and wave-multiplexing section 2 wave-multiplexes downlink optical signals from an output port of the element 10, and inputs the same to an optical fiber 33 connected to an ONU. The section 2 also wave-branches uplink optical signals from an ONU and inputs uplink optical signals to an input port of the element 11.

The optical/electrical conversion section 3 converts a downlink optical light signal from the section 1 to an electric signal.

A branching section 7 branches the electric signal from the section 3 to two signals, and inputs one signal to a delay section 8 and the other signal to a control section 34.

The delay section 8 delays the electrical signal from the section 7 by an amount of time including the time required for the process after the control section 34 and the time required for the switching of the downlink packet at an optimum timing, and thereafter inputs the electrical signal to an electrical/optical conversion section 9.

The electrical/optical conversion section (E/O) 9 converts the electrical signal from the section 8 to an optical signal, and inputs the optical signal to the element 10.

The downlink optical switch element 10 has one input port and n output ports, and switches the downlink optical signal from the section 9 and connects the input port and an output port in packet unit (for every packet) according to the instruction of the section 34. The optical signal from an output port of the element 10 is input to a section 2.

The uplink optical switch element 11 has n input ports and one output port. The element 11 switches the uplink optical signal from a section 2, and connects an input port and the output port in packet unit according to the instruction of the section 34. The optical signal from the output port of the element 11 is input to an optical/electrical conversion section (O/E) 12.

The optical/electrical conversion section 12 converts the optical signal from the output port of the element 11 to an electrical signal and inputs the electrical signal to a multiplexing section 14.

The multiplexing section 14 multiplexes the electrical signal from the section 12 and an electrical signal from the section 34, and inputs the result thereof to an electrical/optical conversion section 15.

The electrical/optical conversion section 15 converts the electrical signal from the section 14 to an optical signal, and inputs the optical signal to the section 1. The section 1 then wave-multiplexes optical signals from the section 15, and sends an optical signal to an OLT through the optical fiber 32.

The control section 34 instructs the element 10 and the element 11 to connect an input port and an output port in packet unit. The instruction is made based on the electrical signal input by the section 7. The section 34 also transmits an electrical signal to the section 14.

Second Embodiment

An optical switching device (OSM) according to a second embodiment of the present invention will be described below with reference to FIG. 5.

The optical switching device (OSM) 31 includes one input/output port connected to an OLT through an optical fiber 32 and n input/output ports connected to n ONUs through optical fibers 33. An input port of a downlink optical switch element 10 and an output port of an uplink optical switch element 11 in the OSM correspond to the port on the OLT side of the OSM 31, and n output ports of the element 10 and n input ports of the element 11 in the OSM correspond to the ports on the ONU side of the OSM 31. The present embodiment has features that the downlink direction has a 3R function and the uplink direction has a 2R function, the round-trip time Tz between the OSM 31 and an ONU is acquired from an OLT, the optical splitter for branching the optical signal is not included, the loss is small, and a delay section 8 is electrically achieved with high precision.

A wave-branching and wave-multiplexing section 1 wave-branches downlink optical signals transmitted from the OLT through the optical fiber 32, and inputs a downlink optical signal to an optical/electrical conversion section (O/E) 3. The section 1 wave-multiplexes uplink optical signals from an electrical/optical conversion section (E/O) 15 and inputs an uplink optical signal to the optical fiber 32 connected to an OLT.

There are n wave-branching and wave-multiplexing sections 2 that are connected to n ONUs through optical fibers 33. A wave-branching and wave-multiplexing section 2 wave-multiplexes downlink optical signals from an output port of the element 10, and inputs an optical signal to an optical fiber 33 connected to an ONU. The section 2 also wave-branches an uplink optical signal from an ONU and inputs an uplink optical signal to an input port of the element 11.

The optical-electric conversion section (O/E) 3 converts a downlink optical signal from the section 1 to an electrical signal, and inputs the electrical signal to a bit buffer 6. Simultaneously, the section 3 extracts a clock signal from the downlink optical signal sent from the section 1. The clock signal is input to a phase synchronous oscillator (PLO) 4, and is used as a write clock for the bit buffer 6.

The phase synchronous oscillator 4 generates a clock pulse synchronized with the clock signal from the section 3, and inputs the pulse to a pulse generator (PG) 5.

The pulse generator 5 generates pulses necessary for the section 6, a reset signal generator 13 and so on, and distributes pulses to each section. A pulse from the pulse generator 5 is used as a read clock in the section 6, and is used to generate a reset pulse of an optical signal level threshold value of the optical/electrical conversion section 12 in the reset signal generator 13.

The bit buffer section 6 writes the electrical signal from the section 3 by the clock signal from the section 3 and reads out the same by the clock of the pulse generator 5. Thus, the clock of the electrical signal converted from the optical signal sent from the OLT is changed from the clock on the transmitting path to the clock in the OSM device.

The branching section 7 branches the electrical signal sent from the bit buffer 6 to two signals, and inputs one signal to a delay section 8 and the other signal to a downlink packet extracting section 20.

The delay section 8 delays the electrical signal by the amount of time needed to apply an optimum timing to the switch of the downlink packet, the amount of time including time required in the electrical signal process from the section 7, and thereafter inputs the electrical signal to the electrical/optical conversion section (E/O) 9.

The electrical/optical conversion section 9 converts the electrical signal sent from the section 8 to the optical signal and inputs the signal to the downlink optical switch element 10.

The downlink switch element 10 is an optical switch element having one input port and n output ports, and switches the downlink optical signal sent from the section 9 and connects the input port and an output port in packet unit according to instructions of a downlink switch control section 24. The optical signal from an output port of the element 10 is input to the section 2.

The uplink optical switch element 11 is an optical switch element having n input ports and one output port, and switches the uplink is optical signal from the section 2 and connects an input port and the output port in packet unit according to instructions of an uplink switch control section 25. The optical signal from the output port of the element 11 is input to an optical/electrical conversion section (O/E) 12.

The optical/electrical conversion section 12 converts the optical signal sent from the output port of the element 11 to an electrical signal. The electrical signal is input to the section 14. The threshold value of optical signal in the section 12 is reset by the pulse from a reset signal generator 13 at the head of the burst signal in packet unit (in burst signal unit) to allow reception of optical signals having different optical levels sent from ONUs that are located in various distances from the OSM 31.

The reset signal generator 13 receives the clock from the pulse generator 5, generates the reset pulse for the threshold value of the optical signal of the section 12, and inputs the reset pulse to the section 12.

The downlink packet extracting section 20 receives the electrical signal from the section 7, extracts a downlink packet, the downlink packet length, and the LLID (Logical Link Identifier) in the preamble of the downlink packet, inputs the downlink packet and the LLID to a downlink packet analyzing section 21, inputs the downlink packet length to a downlink switch control section 24, and inputs the LLID to a LLID-port-Tz table managing section 23.

The downlink packet analyzing section 21 receives the LLID and the downlink packet from the section 20, and performs the following process if the LLID does not correspond to the OSM 31.

(21-1) When a packet is judged a GATE message, it is determined whether the type is "discovery", "ranging", or "transmission control", and whether the discovery process is in progress. The time information (Time Stamp) t1, the transmission start time (Grant Start Time) t2, and the transmission duration (Grant Length) T2 are obtained from the message. The type of the message, t2 and T2 are input to a uplink switch control section 25. The time information t1 is input to a device time managing section 22. The information on whether the process is in the middle of discovery and the fact that the GATE message is detected are input to an LLID-port-Tz table managing section 23.

(21-2) When a packet is judged a REGISTER message, the time information t1 and the LLID (hereinafter, referred to as LLID_Reg if necessary) that is assigned to an ONU by the OLT and is written in the information region (payload region) of the message, are obtained. The time information t1 is input to the section 22, and the LLID_Reg is input to the section 23.

(21-3) When a packet is judged to indicate the relationship between the LLID and Tz (a round-trip time between the ONU corresponding to the LLID and the OSM), the relationship between the LLID and Tz is obtained from the packet, and the relationship between the LLID and Tz is input to the section 23.

The section 21 receives an LLID and the downlink packet from the section 20, and performs the following process if the LLID corresponds to the OSM 31.

(21-4) When a packet is judged a discovery GATE message and an LLID is not assigned to the OSM 31 (an LLID does not exist), the time information (Time Stamp) t1, the transmission start time (Grant Start Time) t2, and the transmission duration (Grant Length) T2 are obtained from the message. The time information t1 is input to the section 22. The REGISTSER_REQ message generating instruction, t2 and T2 are input to an uplink packet generation and transmission control section 26. If an LLID is assigned (including a case where an LLID is set beforehand), no process is performed.

(21-5) When a packet is judged a ranging GATE message, the time information (Time Stamp) t1, the transmission start time (Grant Start Time) t2, and the transmission duration (Grant Length) T2 are obtained from the message. The time information t1 is input to the section 22. The REGISTSER_ACK message generating instruction, t2 and T2 are input to the section 26.

(21-6) When a packet is judged a transmission control GATE message, the time information (Time Stamp) t1, the transmission start time (Grant Start Time) t2, and the transmission duration (Grant Length) T2 are obtained from the message. The time information t1 is input to the section 22. The REPORT message generating instruction, t2 and T2 are input to the section 26.

The device time managing section 22 sets the time information (Time Stamp) t1 sent from the section 21 at its own clock, and inputs the time to the section 25 and the section 26.

The LLID-port-Tz table managing section 23 performs the following process.

(23-1) The correspondence relation between the LLID and the Tz (a round-trip time between the ONU corresponding to the LLID and the OSM) is received from the section 21, the LLID-Tz table is created, and Tz is output when an LLID is provided. The LLID-Tz table is updated each time reception from the section 21 is made.

(23-2) The LLID is received from the section 20, one port k (k=1, 2, ..., n) is selected from n ports when the LLID is for broadcast, and the port k and the switch instruction "tgr" are input to the section 24. The port k is changed every discovery period so that all ports are selected in n periods.

(23-3) When the section 23 receives the information that the discovery process is going on, and the GATE message detecting information from the section 21 after (23-2), the port k defined in (23-2) is input to the section 25.

(23-4) When the section receives the information that the discover process is going on, and the LLID_Reg from the section 21, the relationship between the port k defined when the LLID is broadcast in (23-2) and the LLID_REG is created. Since the (23-2) changes the port number for each discovery period, the LLID-port table of the relationship between all the port numbers and the LLIDs is created after n periods. The corresponding port number can be obtained when an LLID is provided from the table.

(23-5) When an LLID is received from the section 20 and the LLID is not for broadcast (i.e., when LLID assigned to a certain ONU), the port number is defined based on the LLID from the LLID-port table created in (23-4), and the port number and the switch instruction "tgr" are input to the section 24.

(23-6) When the section 23 receives the information that the discovery process is not in progress, and the GATE message detecting information from the section 21 after (23-5), Tz is obtained based on the port number defined from the LLID in (23-5) and the LLID from the LLID-Tz table created in (23-1), and the port number and the Tz are input to the section 25.

The section 24 receives the port number and the switch instruction "tgr" from the section 23, receives the downlink packet length from the section 20, and instructs the element 10 to establish connection between the input port and the output port of the port number and keep the connection only for the time equal to the packet length.

The uplink switch time managing section 25 receives the type of GATE message from the section 21, receives the port number and Tz from the section 23, instructs the element 11 to establish connection between the input port of the port number and the output port at the connection start time ts based on the time in the section 22, and keep the connection for the connection duration Td. The time ts and the duration Td are defined as below from the transmission start time (Grant Start Time), t2, and the transmission duration (Grant Length) T2 of the GATE message.

(25-1) When the GATE message is for discovery, ts=t2, Td=Tdw (discovery window time: time set in advance depending on a system design). Thus, the REGISTER_REQ message from the ONU can be passed.

(25-2) When the GATE message is for ranging, ts=t2, Td=Trw (ranging window time: time set in advance depending on a system design). Thus, the REGISTER_ACK message from the ONU can be passed.

(25-3) When the GATE message is for transmission control, ts=t2+Tz, Td=T2. Thus, the packet transmitted by the ONU based on the GATE message can be passed.

The section 26 generates the packet instructed by the section 21, receives the time from the section 22, and transmits the uplink packet to the section 14 according to the transmission start time t2 and the transmission duration T2 sent from the section 21.

The section 14 multiplexes electrical signals from the section 12 and the section 26, and inputs a signal to the section 15.

The section 15 converts the electrical signal from the multiplexing section 14 to the optical signal, and inputs the signal to the section 1.

Third Embodiment

Figure 6:
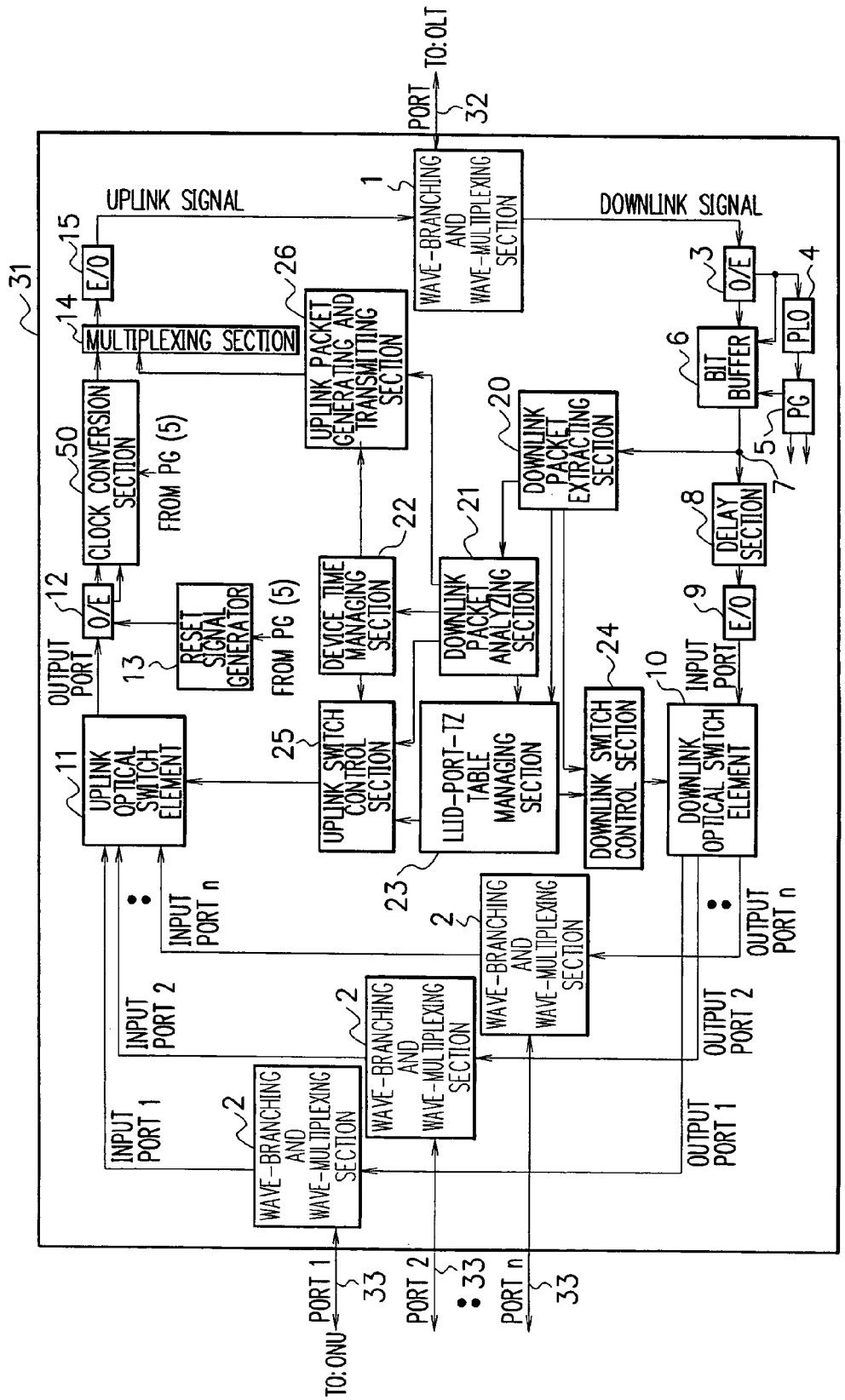
FIG. 6 is a schematic configuration diagram of an optical switching device (OSM) according to a third embodiment.

An optical switching device (OSM) according to a third embodiment of the present invention will be described below with reference to FIG. 6.

The optical switching device (OSM) 31 includes one input/output port connected to an OLT through an optical fiber 32 and n input/output ports connected to n ONUs through optical fibers 33. The input port of a downlink optical switch element 10 and the output port of an uplink optical switch element 11 in the OSM correspond to the port on the OLT side of the OSM 31, and n output ports of the downlink optical switch element and n input ports of the uplink optical switch element in the OSM correspond to the ports on the ONU side of the OSM 31. The present embodiment has features that the downlink direction and the uplink direction both have a 3R function, the round-trip time Tz between the OSM 31 and an ONU is obtained from the OLT, the optical splitter for branching the optical signal is not included, the loss is small, and a delay section 8 is electrically achieved with high precision.

A wave-branching and wave-multiplexing section 1 wave-branches downlink optical signals transmitted from the OLT through the optical fiber 32, and inputs the downlink optical signals to an optical/electrical conversion section (O/E) 3. The section 1 wave-multiplexes uplink optical signals from an electrical/optical conversion section (E/O) 15 and inputs an uplink optical signal to the optical fiber 32 connected to the OLT.

There are n wave-branching and wave-multiplexing sections 2, which are connected to n ONUs through the optical fibers 33. The section 2 wave-multiplexes downlink optical signals from the output ports of the element 10, and inputs a signal to an optical fiber 33 connected to an ONU. The section 2 also wave-branches uplink optical signals from an ONU and inputs an uplink optical signal to an input port of the element 11.

An optical-electric conversion section 3 converts a downlink optical signal sent from the section 1 to an electrical signal, and inputs the electrical signal to a bit buffer 6. Simultaneously, the section 3 extracts a clock signal from the downlink optical signal from the section 1. The clock is input to a phase synchronous oscillator (PLO) 4, and is used as a write clock for the bit buffer 6.

The phase synchronous oscillator 4 generates a clock pulse synchronized with the clock from the section 3, and inputs the pulse to a pulse generator (PG) 5.

The pulse generator 5 generates the pulse necessary for the section 6, a reset signal generator 13, a clock conversion section 50 and so on, and distributes pulses to each section. The pulses from the pulse generator 5 are used as a read clock in the section 6, are used to generate the reset pulse of an optical signal level threshold value of an optical/electrical conversion section 12 in the reset signal generator 13, and are used as a read clock for a clock conversion section 50.

The bit buffer section 6 writes the electrical signal sent from the section 3 by the clock from the section 3 and reads out the same by the clock of the pulse generator 5. Thus, the clock of the electrical signal converted from the optical signal sent from the OLT is changed from the clock on the transmitting path to the clock in the OSM device.

The branching section 7 branches the electrical signal from the bit buffer 6 to two signals, and inputs one signal to the delay section 8 and the other signal to a downlink packet extracting section 20.

The delay section 8 delays the electrical signal by the amount of time that is needed to optimize a timing for switching of a downlink packet and that includes the time required in the electrical signal process from the branching section 7, and thereafter inputs the electrical signal to an electrical/optical conversion section (E/O) 9.

The electrical/optical conversion section 9 converts the electrical signal from the section 8 to an optical signal and inputs the signal to the downlink optical switch element 10.

The downlink switch element 10 is an optical switch element having one input port and n output ports, and switches the downlink optical signal from the section 9 and connects the input port and an output port in packet unit according to instructions of a downlink switch control section 24. The optical signal from an output port of the element 10 is input to the section 2.

The uplink optical switch element 11 is an optical switch element having n input ports and one output port, and switches the uplink optical signal from the section 2 and connects an input port and the output port in packet unit according to instructions of an uplink switch control section 25. The optical signal from the output port of the element 11 is input to an optical/electrical conversion section (O/E) 12.

The optical/electrical conversion section 12 converts the optical signal from the output port of the element 11 to an electrical signal, and extracts the clock. The electrical signal from the section 12 is input to the clock conversion section 50. The clock from the section 12 is input to a write clock of the section 50. The threshold value of the optical signal of the section 12 is reset by the pulse from a reset signal generator 13 at the head of the burst signal in packet unit (burst signal unit) to allow reception of the optical signals having different optical levels from ONUs with various distances from the OSM 31.

The reset signal generator 13 receives the clock from the pulse generator 5, generates the reset pulse of the threshold value of the optical signal of the section 12, and inputs the reset pulse to the section 12.

The clock conversion section 50 writes the electrical signal converted from the optical signal sent from the ONU by the clock on the transmission path sent from the section 12, and reads out by the clock from the pulse generator 5 to change a clock to the clock in the OSM device and input the signal to a multiplexing section 14.

The downlink packet extracting section 20 receives the electrical signal from the section 7, extracts the downlink packet, the downlink packet length, and the LLID (Logical Link Identifier) in the preamble of the downlink packet, inputs the downlink packet and the LLID to a downlink packet analyzing section 21, inputs the downlink packet length to the downlink switch control section 24, and inputs the LLID to a LLID-port-Tz table managing section 23.

The downlink packet analyzing section 21 receives the LLID and the downlink packet from the section 20, and performs the following process if the LLID does not correspond to the OSM 31.

(21-1) When a packet is judged a GATE message, it is determined whether the type is "discovery", "ranging", or "transmission control", and whether the discovery process is going on, and the time information (Time Stamp) t1, the transmission start time (Grant Start Time) t2, and the transmission duration (Grant Length) T2 are obtained from the message. The type of the message, t2 and T2 are input to the uplink switch control section 25. The tine information t1 is input to the device time managing section 22. The information on whether the discovery process is going on and the information on detection of the GATE message are input to the LLID-port-Tz table managing section 23.

(21-2) When a packet is judged a REGISTER message, the time information t1 and the LLID (hereinafter, referred to as LLID_Reg if necessary), the LLID being written on the information region (payload region) of the message and assigned to an ONU by the OLT, are obtained, t1 is input to the section 22, and the LLID_Reg is input to the section 23.

(21-3) When a packet is judged to indicate the relationship between the LLID and the Tz (a round-trip time between the ONU corresponding to the LLID and the OSM), the relationship is obtained from the packet and is input to the section 23.

The section 21 receives the LLID and the downlink packet from the section 20, and performs the following process if the LLID corresponds to the OSM 31.

(21-4) When a packet is judged a discovery GATE message when an LLID is not assigned to the OSM 31 (an LLID does not exist), the time information (Time Stamp) t1, the transmission start time (Grant Start Time) t2, and the transmission duration (Grant Length) T2 are obtained from the message, t1 is input to the section 22, the REGISTSER_REQ message generating instruction, t2 and T2 are input to an uplink packet generation and transmission control section 26. If an LLID is assigned (for example, when an LLID is set beforehand), no process is performed.

(21-5) When a packet is judged a ranging GATE message, the time information (Time Stamp) t1, the transmission start time (Grant Start Time) t2, and the transmission duration (Grant Length) T2 are obtained from the message, t1 is input to the section 22, and the REGISTSER_ACK message generating instruction, t2 and T2 are input to the section 26.

(21-6) When a packet is judged a transmission control GATE message, the time information (Time Stamp) t1, the transmission start time (Grant Start Time) t2, and the transmission duration (Grant Length) T2 are obtained from the message, t1 is input to the section 22, and the REPORT message generating instruction, t2 and T2 are input to the section 26.

The section 22 sets the time information (Time Stamp) t1 from the section 21 at its clock, and inputs the time to the section 25 and the section 26.

The LLID-port-Tz table managing section 23 performs the following process.

(23-1) The correspondence relation between the LLID and the Tz (a round-trip time between the ONU corresponding to the LLID and the OSM) is received from the section 21, the LLID-Tz table is created, and Tz is output when an LLID is provided. The LLID-Tz table is updated each time the information from the section 21 is received.

(23-2) The LLID is received from the section 20, one port k (k=1, 2, ..., n) is selected from n ports when the LLID is for broadcast, and the port k and the switch instruction "tgr" are input to the section 24. The port k is changed every discovery period, so that all ports are selected in n periods.

(23-3) When the information that the discovery process is going on, and the GATE message detecting information from the section 21 are received after (23-2), the port k defined in (23-2) is input to the section 25.

(23-4) When the information that the discovery process is going on, and the LLID_Reg from the section 21 are received, the relationship between the port k, which is defined when the LLID is transmitted in (23-2), and the LLID_REG is created. Since the process (23-2) changes the port number every discovery period, the LLID-port table describing the relationship between all the port numbers and LLIDs is created after n periods. The corresponding port number can be obtained when an LLID is provided from the table.

(23-5) When the LLID is received from the section 20 and the LLID is not for broadcast (i.e., when the LLID is assigned to a certain ONU), the port number is defined based on the LLID from the LLID-port table created in (23-4) and the port number and the switch instruction "tgr" are input to the section 24.

(23-6) When the information that the discovery process is not in progress and the GATE message detecting information from the section 21 after (23-5), Tz is obtained based on the port number defined from the LLID in (23-5) and the LLID from the LLID-Tz table created in (23-1), and the port number and the Tz are input to the section 25.

The downlink switch control section 24 receives the port number and the switch instruction "tgr" from the section 23, receives the downlink packet length from the 20, and instructs the element 10 to establish connection between the input port and the output port of the port number and keep the connection for only the time equal to the packet length.

The uplink switch time managing section 25 receives the type of GATE message from the section 21, receives the port number and Tz from the section 23, and instructs the element 11 to establish connection between the input port of the port number and the output port at the connection start time ts based on the time in the section 22 and keep the connection for the connection duration Td. The time ts and the duration Td are defined as below from the transmission start time (Grant Start Time), t2, and the transmission duration (Grant Length) T2 of the GATE message.

(25-1) When the GATE message is for discovery, ts=t2, Td=Tdw (discovery window time: time set in advance depending on a system design). Thus, the REGISTER_REQ message from an ONU can be passed.

(25-2) When the GATE message is for ranging, ts=t2, Td=Trw 10 (ranging window time: time set in advance depending on a system design). Thus, the REGISTER_ACK message from an ONU can be passed.

(25-3) When the GATE message is for transmission control, ts=t2+Tz, Td=T2. Thus, packets transmitted by an ONU based on the is GATE message can be passed.

The uplink packet generating and transmitting section 26 generates the packet instructed by the section 21, receives the time from the section 22, and transmits the uplink packet to the section 14 according to the transmission start time t2 and the transmission duration T2 from the section 21.

The multiplexing section 14 multiplexes electrical signals from the section 12 and electrical signals from the section 26, and inputs a signal to the section 15.

The electrical/optical conversion section 15 converts the electrical signal from the section 14 to an optical signal, and inputs the signal to the section 1.

Fourth Embodiment

Figure 7:
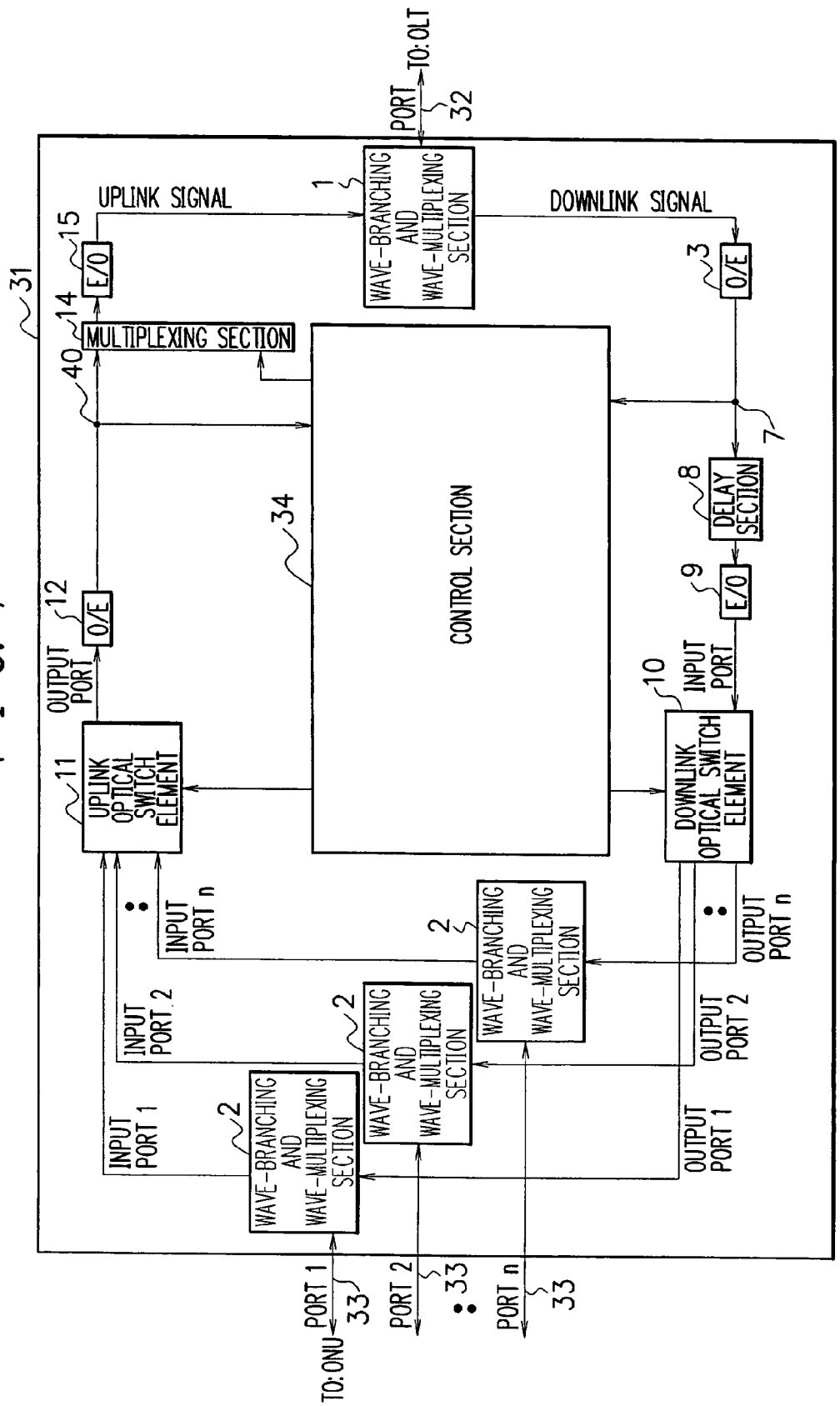
FIG. 7 is a schematic configuration diagram of an optical switching device (OSM) according to a fourth embodiment.

An optical switching device (OSM) according to a fourth embodiment of the present invention will be described below with reference to FIG. 7.

The optical switching device (OSM) 31 includes one input/output port connected to an OLT through an optical fiber 32 and n input/output ports connected to n ONUs through optical fibers 33. An input port of a downlink optical switch element 10 and an output port of an uplink optical switch element 11 in the OSM correspond to the port on the OLT side of the OSM 31, and n output ports of the element 10 and n input ports of the element 11 in the OSM correspond to the ports on the ONU side of the OSM 31. The present embodiment has features that an uplink optical signal is also used for the control of the OSM 31, the optical splitter for branching the optical signal is not included, the loss is small, and a delay section 8 is electrically achieved with high precision.

A wave-branching and wave-multiplexing section 1 wave-branches a downlink optical signal transmitted from the OLT through the optical fiber 32, and inputs the downlink optical signal to an optical/electrical conversion section 3. The section 1 wave-multiplexes uplink optical signals from an electrical/optical conversion section 15 and inputs an uplink optical signal to the optical fiber 32 connected to the OLT.

There are n wave-branching and wave-multiplexing sections 2 that are connected to n ONUs through optical fibers 33. A section 2 wave-multiplexes downlink optical signals from an output port of the element 10, and inputs a signal to the optical fiber 33 connected to an ONU. The section 2 also wave-branches an uplink optical signal from an ONU and inputs an uplink optical signal to an input port of the element 11.

An optical/electrical conversion section 3 converts downlink optical signals from the section 1 to an electrical signal.

A branching section 7 branches an electric signal from the section 3 to two signals, and inputs one signal to the section 8 and the other signal to a control section 34.

The delay section 8 delays an electrical signal from the section 7 by an amount of time needed to optimize timing for the switching of downlink packets. The time required for the process after the control section 34 is included in the amount of delay. The section 8 inputs the electrical signal to an electrical/optical conversion section 9.

The electrical/optical conversion section (E/O) 9 converts the electrical signal from the section 8 to an optical signal, and inputs the signal to the downlink optical switch element 10.

The downlink optical switch element 10 is an optical switch element having one input port and n output ports, and switches the downlink optical signal from the section 9 and connects the input port and an output port in packet unit according to instructions of the control section 34. The optical signal from an output port of the element 10 is input to the section 2.

The uplink optical switch element 11 is an optical switch element having n input ports and one output port, and switches an uplink optical signal from the section 2 and connects an input port and the output port in packet unit according to instructions of the control section 34. The optical signal from the output port of the element 11 is input to an optical/electrical conversion section 12.

The optical/electrical conversion section 12 converts the optical signal from the output port of the element 11 to an electrical signal and inputs the signal to a multiplexing section 14.

The branching section 40 branches the electrical signal from the section (O/E) 12 to two, and inputs one signal to the multiplexing section 14 and the other signal to the control section 34.

The multiplexing section 14 multiplexes the electrical signal from the section 40 and the electrical signal from the section 34, and inputs the result thereof to an electrical/optical conversion section 15.

The electrical/optical conversion section 15 converts the electrical signal from the section 14 to an optical signal, and inputs the signal to the section 1.

The section 1 wave-multiplexes optical signals from the section 15 and sends an optical signal to the OLT via the optical fiber 32.

The control section 34 instructs the element 10 and the element 11 to connect an input port and an output port in packet unit. The instruction is made based on the electrical signal input by the section 7 and the section 40. The control section 34 also transmits an electrical signal to the section 14.

Fifth Embodiment

Figure 8:
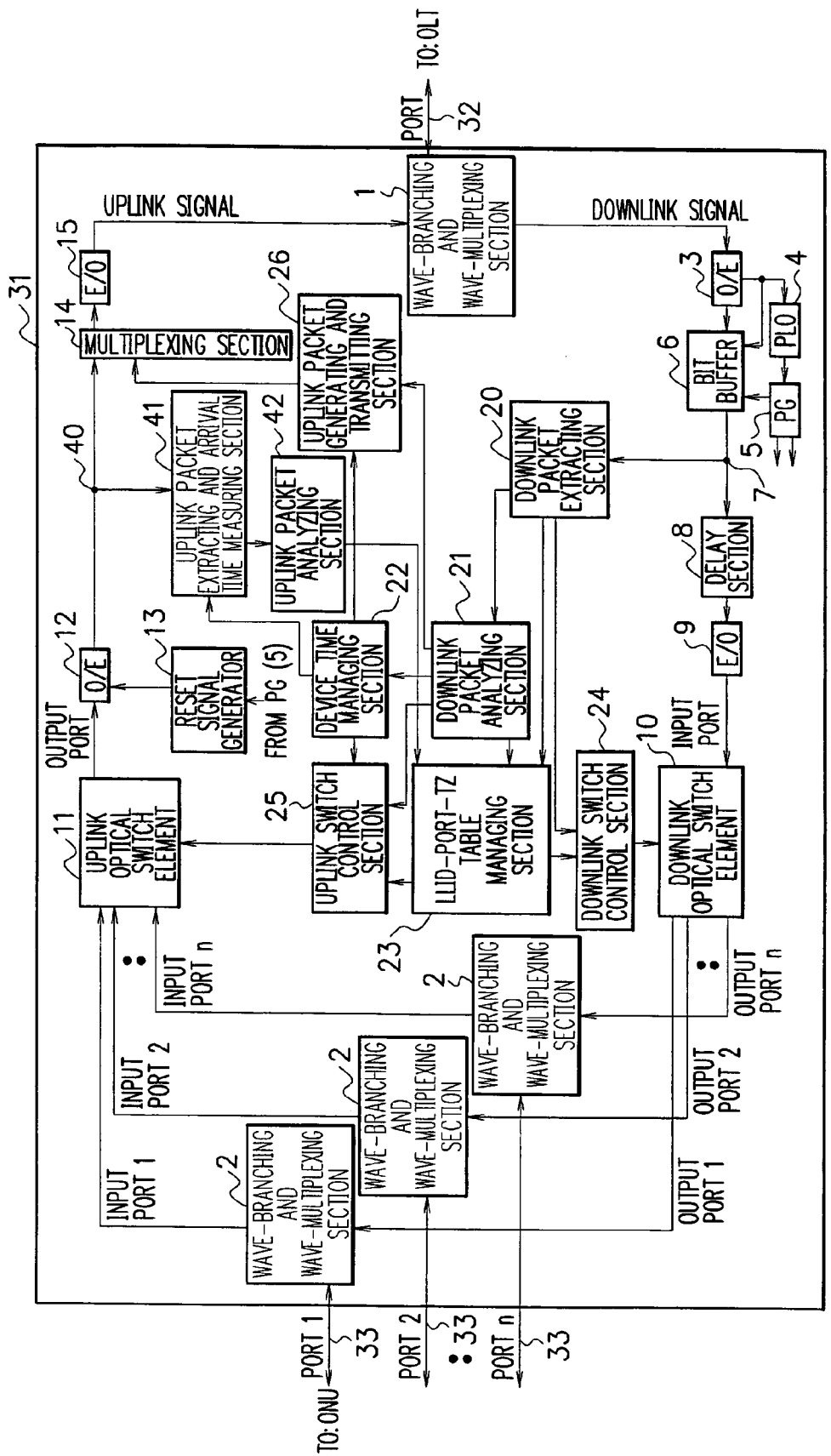
FIG. 8 is a schematic configuration diagram of an optical switching device (OSM) according to a fifth embodiment.

An optical switching device (OSM) according to a fifth embodiment of the present invention will be described below with reference to FIG. 8.

The optical switching device (OSM) 31 includes one input/output port connected to an OLT through an optical fiber 32 and n input/output ports connected to n ONUs through optical fibers 33. An input port of a downlink optical switch element 10 and an output port of an uplink optical switch element 11 in the OSM correspond to one port on the OLT side of the OSM 31, and n output ports of the element 10 and n input ports of the element 11 correspond to ports on the ONU side of the OSM 31. The present embodiment has features that the downlink direction has a 3R function and the uplink direction has a 2R function, a round-trip time Tz between the OSM 31 and an ONU is automatically measured, the optical splitter for branching an optical signal is not included, the loss is small, and a delay section 8 is electrically achieved with high precision.

A wave-branching and wave-multiplexing section 1 wave-branches downlink optical signals transmitted from the OLT through the optical fiber 32, and inputs a downlink optical signal to an optical/electrical conversion section (O/E) 3. The section 1 wave-multiplexes uplink optical signals from an electrical/optical conversion section (E/O) 15 and inputs an uplink optical signal to the optical fiber 32 connected to the OLT.

There are n wave-branching and wave-multiplexing sections 2 that are connected to n ONUs through optical fibers 33. The section 2 wave-multiplexes downlink optical signals from an output port of the element 10, and inputs a signal to an optical fiber 33 connected to an ONU. The section 2 also wave-branches an uplink optical signal from an ONU and inputs an uplink optical signal to an input port of the element 11.

The optical/electric conversion section 3 converts the downlink optical signal from the section 1 to an electrical signal, and inputs the electrical signal to a bit buffer 6. Simultaneously, the section 3 extracts the clock from the downlink optical signal from the section 1. The clock is input to a phase synchronous oscillator (PLO) 4, and is used as a write clock of the bit buffer 6.

The phase synchronous oscillator 4 generates a clock pulse synchronized with the clock from the section 3, and inputs pulses to a pulse generator (PG) 5.

The pulse generator 5 generates a pulse for the bit buffer section 6, the reset signal generator 13 and so on, and distributes pulses to each section. The pulse from the pulse generator 5 is used as a read clock in the section 6, and is used to generate the reset pulse for an optical signal level threshold value of an optical/electrical conversion section 12 in a reset signal generator 13.

The bit buffer section 6 writes the electrical signal from the section 3 by the clock from the section 3 and reads out the same by the clock of the pulse generator 5. Thus, the clock of the electrical signal converted from the optical signal sent from the OLT is changed from the clock on the transmitting path to the clock in the OSM device.

The branching section 7 branches an electrical signal from the section 6 after the clock is changed to that in the OSM device, and inputs one signal to a delay section 8 and the other signal to a downlink packet extracting section 20.

The delay section 8 delays the electrical signal by an amount of time needed to optimize timing of switching of downlink packets. The amount of delay includes the time required for the electrical signal process from the branching section 7. The section 8 inputs the electrical signal to an electrical/optical conversion section (E/O) 9.

The electrical/optical conversion section 9 converts the electrical signal from the section 8 to an optical signal and inputs the signal to a downlink optical switch element 10.

The downlink switch element 10 is an optical switch element having one input port and n output ports, and switches a downlink optical signal from the section 9 and connects the input port and an output port in packet unit according to instructions of a downlink switch control section 24. The optical signal from an output port of the element 10 is input to the section 2.

The uplink optical switch element 11 is an optical switch element having n input ports and one output port, and switches an uplink optical signal from the section 2 and connects an input port and the output port in packet unit according to instructions of the uplink switch control section 25. The optical signal from the output port of the uplink optical switch element 11 is input to an optical/electrical conversion section (O/E) 12.

The optical/electrical conversion section 12 converts an optical signal from the output port of the element 11 to an electrical signal. The electrical signal from the section 12 is input to the branching section 40. In the section 12, the threshold value for the optical signal is reset by the pulse from the reset signal generator 13 at the head of the burst signal in packet unit (burst signal unit) to allow reception of the optical signals having different optical levels from a plurality of ONU having different distance from the OSM 31.

The reset signal generator 13 receives the clock from the pulse generator 5, generates the reset pulse of the threshold value for the optical signal, and inputs the reset pulse to the section 12.

A branching section 40 branches the electrical signal from the section 12 into two signals, and inputs one electrical signal to a packet extracting and arrival time measuring section 41, and inputs the other electrical signal to a multiplexing section 14.

A downlink packet extracting section 20 receives the electrical signal from the section 7, extracts the downlink packet, the downlink packet length, and the LLID (Logical Link Identifier) in the preamble of the downlink packet, inputs the downlink packet and the LLID to a downlink packet analyzing section 21, inputs the downlink packet length to a downlink switch control section 24, and inputs the LLID to a LLID-port-Tz table managing section 23.

The downlink packet analyzing section 21 receives the LLID and the downlink packet from the section 20, and performs the following process if the LLID does not correspond to the OSM 31.

(21-1) When a packet is judged a GATE message, it is determined whether the type is for "discovery", "ranging", or "transmission control" and whether the discovery process is going on. The time information (Time Stamp) t1, the transmission start time (Grant Start Time) t2, and the transmission duration (Grant Length) T2 are obtained from the message. The type of the message, t2 and T2 are input to the section 25. The time information t1 is input to the section 22, and the information on whether the discovery process is in progress and the fact of detection of the GATE message are input to the section 23.

(21-2) When a packet is judged a REGISTER message, the time information t1, and the LLID (hereinafter, referred to as LLID_Reg if necessary), the LLID being written on the information region (payload region) of the message and assigned to an ONU by the OLT, are obtained, t1 is input to the section 22, and the LLID_Reg is input to the section 23.

The section 21 receives the LLID and the downlink packet from the section 20, and performs the following process if the LLID corresponds to the OSM 31.

(21-3) When a packet is judged a discovery GATE message when LLID is not assigned to the OSM 31 (LLID does not exist), the time information (Time Stamp) t1, the transmission start time (Grant Start Time) t2, and the transmission duration (Grant Length) T2 are obtained from the message, t1 is input to the section 22, the REGISTSER_REQ message generating instruction, t2 and T2 are input to an uplink packet generation and transmission control section 26. If an LLID is assigned (including when an LLID is set beforehand), no process is performed.

(21-4) When a packet is judged a ranging GATE message, the time information (Time Stamp) t1, the transmission start time (Grant Start Time) t2, and the transmission duration (Grant Length) T2 are obtained from the message, t1 is input to the section 22, and the REGISTSER_ACK message generating instruction, t2 and T2 are input to the section 26.

(21-5) When a packet is judged a transmission control GATE message, the time information (Time Stamp) t1, the transmission start time (Grant Start Time) t2, and the transmission duration (Grant Length) T2 are obtained from the message, t1 is input to the section 22, and the REPORT message generating instruction, t2 and T2 are input to the section 26.

The section 22 sets the time information (Time Stamp) t1 from the section 21 at its clock, and inputs the time to the section 25, the section 26 and the section 41.

The uplink packet extracting and arrival time measuring section 41 extracts an uplink packet from the electrical signal from the section 40, and measures the arrival time t3 of the uplink packet based on the time given from the section 22. The extracted uplink packet and the arrival time t3 thereof are input to an uplink packet analyzing section 42.

The uplink packet analyzing section 42 performs the following process on the uplink packet and the arrival time t3 from the section 41.

(42-1) When a packet is judged a REGISTER_ACK message, the LLID, and time information (Time Stamp) t1 written on the message are acquired, and the round-trip time Tz between the OSM 31 and an ONU is calculated as Tz=t3−t1 using the arrival time t3 of the REGISTER_ACK message from the section 41, and the relationship between the LLID and the Tz is input to the section 23.

(42-2) When a packet is judged a REPORT message, the LLID, and time information (Time Stamp) t1 written on the message are acquired, and Tz is calculated as Tz=t3−t1 using the arrival time t3 of the REPORT message from the section 41, and the relationship between the LLID and the Tz is input to the section 23.

The section 23 performs the following process.

(23-1) The correspondence between the LLID and the Tz (a round-trip time between the ONU corresponding to the LLID and the OSM) is received from the section 42, the LLID-Tz table is created, and Tz is output when an LLID is provided. The LLID-Tz table is updated every time the information is received from the section 42.

(23-2) The LLID is received from the section 20, one port k (k=1, 2, . . . , n) is selected from n ports when the LLID is for broadcast, and the port k and the switch instruction "tgr" are input to the section 24. The port k is changed every discovery period so that all ports are selected in n periods.

(23-3) When the information whether the discovery process is in progress, and the GATE message detecting information are received from the section 21 after (23-2), the port k defined in (23-2) is input to the section 25.

(23-4) When the information whether the discovery process is in progress, and the LLID_Reg are received from the section 21, the relationship between the port k, which is defined when the LLID is broadcast in (23-2), and the LLID_REG is created. Since the process (23-2) changes the port number every discovery period, the LLID-port table of the relationship between all the port numbers and the LLID is created after n periods. The corresponding port number can be obtained when an LLID is provided from the table.

(23-5) The LLID is received from the section 20, the port number is defined based on the LLID from the LLID-port table created in (23-4) when the LLID is not for broadcast (i.e., when the LLID is assigned to a certain ONU), and the port number and the switch instruction "tgr" are input to the section 24.

(23-6) When the information that the discovery process is not in progress, and the GATE message detecting information are received from the section 21 after (23-5), Tz is obtained based on the port number defined from the LLID in (23-5) and the LLID from the LLID-Tz table created in (23-1), and the port number and the Tz are input to the section 25.

The section 24 receives the port number and the switch instruction "tgr" from the section 23, receives the downlink packet length from the section 20, and instructs the element 10 to establish connection between an input port and an output port of the port number and keep the connection only for the time equal to the packet length.

The section 25 receives the type of GATE message from the section 21, receives the port number and Tz from the section 23, and instructs the element 11 to establish connection between an input port of the port number and an output port at the connection start time ts based on the time given by the section 22 and keep the connection for the connection duration Td. The time ts and Td are defined as below from the transmission start time (Grant Start Time), t2, and the transmission duration (Grant Length) T2 of the GATE message.

(25-1) When the GATE message is for discovery, ts=t2, Td=Tdw (discovery window time: time set in advance depending on a system design). Thus, the REGISTER_REQ message from an ONU can be passed.

(25-2) When the GATE message is for ranging, ts=t2, Td=Trw (ranging window time: time set in advance depending on a system design). Thus, the REGISTER_ACK message from an ONU can be passed.

(25-3) When the GATE message is for transmission control, ts=t2+Tz, Td=T2. Thus, the packet transmitted by an ONU based on the GATE message can be passed.

The section 26 generates the packet instructed by the section 21, receives the time from the section 22, and transmits an uplink packet to the section 14 according to the transmission start time t2 and the transmission duration T2 from the section 21.

The multiplexing section 14 multiplexes an electrical signal from the section 40 and the electrical signal from the section 26, and inputs a signal to the electrical/optical conversion section (E/O) 15.

The electrical/optical conversion section 15 converts the electrical signal from the section 14 to an optical signal, and inputs the signal to the section 1.

Sixth Embodiment

Figure 9:
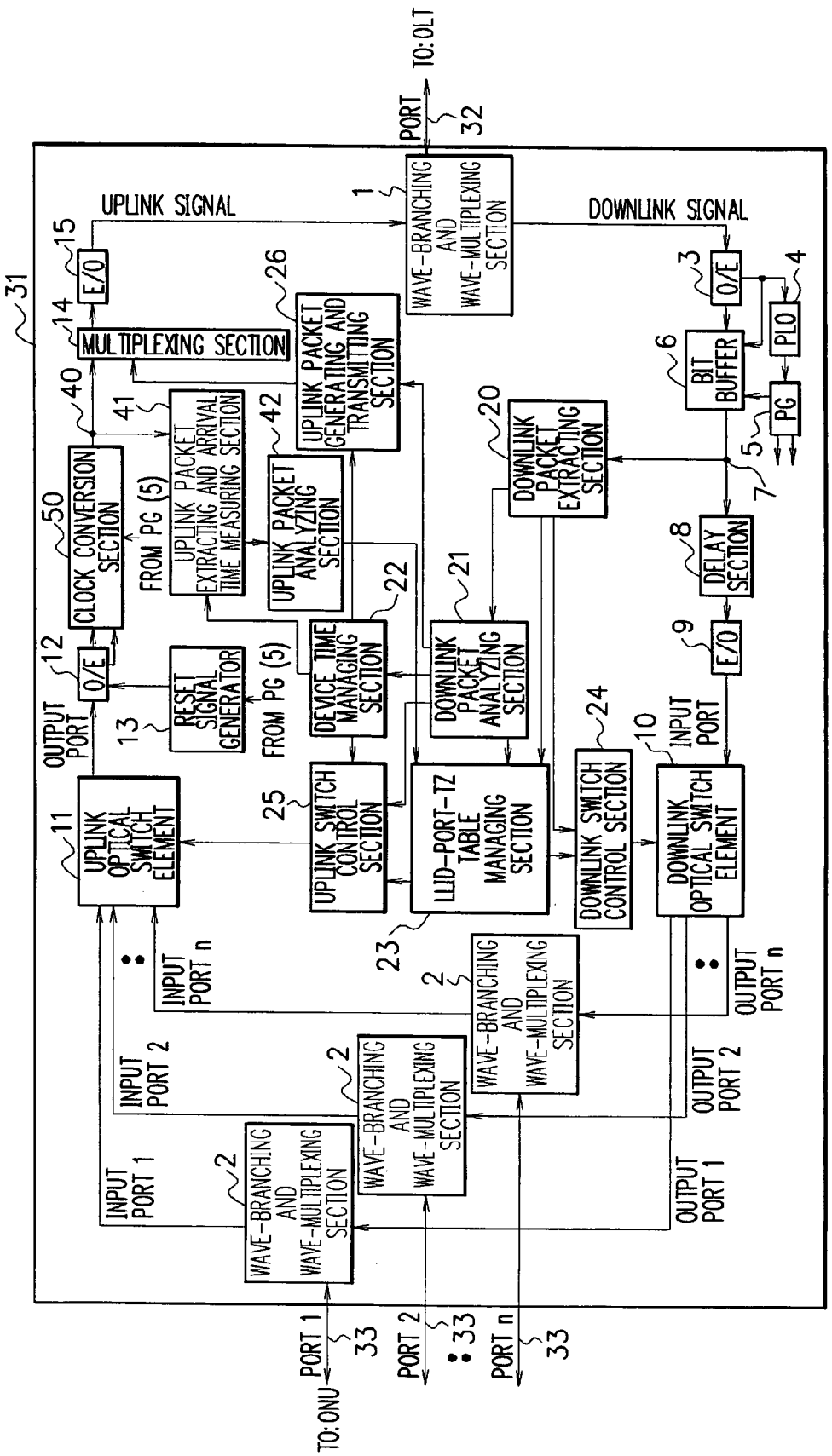
FIG. 9 is a schematic configuration diagram of an optical switching device (OSM) according to a sixth embodiment.

An optical switching device (OSM) according to a sixth embodiment of the present invention will be described below with reference to FIG. 9.

The optical switching device (OSM) 31 includes one input/output port connected to an OLT through the optical fiber 32 and n input/output ports connected to n ONUs through optical fibers 33. One input port of a downlink optical switch element 10 and one output port of an uplink optical switch element 11 in the OSM correspond to one port on the OLT side of the OSM 31, and n output ports of the element 10 and n input ports of the element 11 in the OSM correspond to the ports on the ONU side of the OSM 31. The present embodiment has features that the downlink direction has a 3R function and the uplink direction has a 2R function, the round-trip time Tz between the OSM 31 and an ONU is automatically measured, the optical splitter for branching the optical signal is not included, the loss is small, and a delay section 8 is electrically achieved with high precision.

A wave-branching and wave-multiplexing section 1 wave-branches downlink optical signals transmitted from the OLT through the optical fiber 32, and inputs a downlink optical signal to an optical/electrical conversion section (O/E) 3. The section 1 wave-multiplexes uplink optical signals from an electrical/optical conversion section (E/O) 15 and inputs an uplink optical signal to the optical fiber 32 connected to the OLT.

There are n wave-branching and wave-multiplexing sections 2 that are connected to n ONUs through the optical fiber 33. A section 2 wave-multiplexes downlink optical signals from an output port of the element 10, and inputs a signal to an optical fiber 33 connected to an ONU. The section 2 also wave-branches uplink optical signals from the ONU and inputs an uplink optical signal to an input port of the element 11.

An optical-electric conversion section 3 converts a downlink optical signal from the section 1 to an electrical signal, and inputs the electrical signal to a bit buffer 6. Simultaneously, the section 3 extracts the clock from the downlink optical signal sent from the section 1. The clock is input to a phase synchronous oscillator (PLO) 4, and is used as a write clock of the bit buffer 6.

The phase synchronous oscillator 4 generates a clock pulse synchronized with the clock from the section 3, and inputs the pulse to a pulse generator (PG) 5.

The pulse generator 5 generates a pulse necessary for the bit buffer section 6, a reset signal generator 13, a clock conversion section 50 etc. and distributes pulses to each section. The pulse from the pulse generator 5 is used as a read clock in the section 6, is used to generate the reset pulse of a threshold value for an optical signal level in the reset signal generator 13, and is used as a read clock in a clock conversion section 50.

The bit buffer section 6 writes an electrical signal from the section 3 by the clock from the section 3 and reads out the signal by the clock of the pulse generator 5. Thus, the clock of the electrical signal is changed from the clock on the transmitting path to the clock in the OSM device.

The branching section 7 branches the electrical signal with the clock of the OSM device from the bit buffer 6 to two signals, and inputs one signal to a delay section 8 and the other signal to a downlink packet extracting section 20.

The delay section 8 delays an electrical signal by an amount of time needed to optimize timing of switching of downlink packets. The amount of time includes the time required for the electrical signal process from the branching section 7. The section 8 inputs an electrical signal to an electrical/optical conversion section (E/O) 9.

The electrical/optical conversion section 9 converts the electrical signal from the section 8 to an optical signal and inputs the signal to a downlink optical switch element 10.

The downlink switch element 10 is an optical switch element having one input port and n output ports, and switches the downlink optical signal from the section 9 and connects the input port and an output port in packet unit according to instructions of a downlink switch control section 24. The optical signal from an output port of the element 10 is input to the section 2.

The uplink optical switch element 11 is an optical switch element having n input ports and one output port, and switches an uplink optical signal from the section 2 and connects an input port with the output port in packet unit according to instructions of an uplink switch control section 25. The optical signal from the output port of the element 11 is input to an optical/electrical conversion section (O/E) 12.

The optical/electrical conversion section 12 converts the optical signal from the output port of the element 11 to an electrical signal, and extracts the clock. The electrical signal from the section 12 is input to a clock conversion section 50. The clock from the section 12 is input to the write clock in the section 50. In the section 12, the threshold value for the optical signal is reset by the pulse from a reset signal generator 13 at the head of a burst signal in packet unit (burst signal unit) to allow reception of the optical signals having different optical levels from ONUs having different distance from the OSM 31.

The reset signal generator 13 receives the clock from the pulse generator 5, generates the reset pulse of the threshold value of the optical signal, and inputs the reset pulse to the section 12.

The clock conversion section 50 writes in an electrical signal by the clock on the transmission path, and reads out the signal by the clock from the pulse generator 5 to change the clock and input the signal to a branching section 40.

The branching section 40 branches an electrical signal from the section 50 into two signals, and inputs one electrical signal to a packet extracting and arrival time measuring section 41, and inputs the other electrical signal to a multiplexing section 14.

The downlink packet extracting section 20 receives the electrical signal from the section 7, extracts the downlink packet, the downlink packet length, and the LLID (Logical Link Identifier) in the preamble of the downlink packet, inputs the downlink packet and the LLID to a downlink packet analyzing section 21, inputs the downlink packet length to a downlink switch control section 24, and inputs the LLID to a LLID-port-Tz table managing section 23.

The downlink packet analyzing section 21 receives the LLID and the downlink packet from the section 20, and performs the following process if the LLID does not correspond to the OSM 31.

(21-1) When a packet is judged a GATE message, it is determined whether the type is "discovery", "ranging", or "transmission control", and whether the discovery process is in progress. The time information (Time Stamp) t1, the transmission start time (Grant Start Time) t2, and the transmission duration (Grant Length) T2 are acquired from the message. The type of the message, t2 and T2 are input to an uplink switch control section 25, t1 is input to the section 22, and the information on whether the discovery process is in progress, and the information that the GATE message is detected are input to the section 23.

(21-2) When packet is judged a REGISTER message, the time information t1, and the LLID (hereinafter, referred to as LLID_Reg if necessary), the LLID being written on the information region (payload region) of the message and assigned to an ONU by the OLT, are acquired, t1 is input to the section 22, and the LLID_Reg is input to the section 23.

The section 21 receives the LLID and the downlink packet from the section 20, and performs the following process if the LLID corresponds to the OSM 31.

(21-3) When a packet is judged a discovery GATE message and an LLID is not assigned to the OSM 31 (an LLID does not exist), the time information (Time Stamp) t1, the transmission start time (Grant Start Time) t2, and the transmission duration (Grant Length) T2 are acquired from the message. The time information t1 is input to the section 22, the REGISTSER_REQ message generating instruction, t2 and T2 are input to an uplink packet generation and transmission control section 26. If an LLID is assigned (including a case where an LLID is set beforehand), no process is performed.

(21-4) When a packet is judged a ranging GATE message, the time information (Time Stamp) t1, the transmission start time (Grant Start Time) t2, and the transmission duration (Grant Length) T2 are acquired from the message. The time information t1 is input to the section 22, and the REGISTSER_ACK message generating instruction, t2 and T2 are input to the section 26.

(21-5) When a packet is judged a transmission control GATE message, the time information (Time Stamp) t1, the transmission start time (Grant Start Time) t2, and the transmission duration (Grant Length) T2 are acquired from the message. The information t1 is input to the section 22, and the REPORT message generating instruction, t2 and T2 are input to the section 26.

The device time managing section 22 sets the time information (Time Stamp) t1 from the section 21 at its clock, and inputs the time to the section 25, the section 26 and the section 41.

The uplink packet extracting and arrival time measuring section 41 extracts the uplink packet from the electrical signal sent from the section 40, and measures the arrival time t3 of the uplink packet based on the time given from the section 22. The extracted uplink packet and the arrival time t3 thereof are input to an uplink packet analyzing section 42.

The uplink packet analyzing section 42 performs the following process on the uplink packet and the arrival time t3 from the section 41.

(42-1) When a packet is judged a REGISTER_ACK message, the LLID, and time information (Time Stamp) t1 written on the message are acquired, and the round-trip time Tz between the OSM 31 and an ONU is calculated as $Tz=t3-t1$ using the arrival time t3 of the REGISTER_ACK message from the section 41, and the relationship between the LLID and the Tz is input to the section 23.

(42-2) When a packet is judged a REPORT message, the LLID, and time information (Time Stamp) t1 written on the message are acquired, and Tz is calculated as $Tz=t3-t1$ using the arrival time t3 of the REPORT message from the section 41, and the relationship between the LLID and the Tz is input to the section 23.

The section 23 performs the following process.

(23-1) The correspondence between the LLID and the Tz (a round-trip time between the ONU corresponding to the LLID and the OSM) is received from the section 42, an LLID-Tz table is created, and Tz is output when an LLID is provided. The LLID-Tz table is updated every time the information is received from the section 42.

(23-2) The LLID is received from the section 20, one port k (k=1, 2, . . . , n) is selected from n ports when the LLID is for broadcast, and the port k and the switch instruction "tgr" are input to the section 24. The port k is changed every discovery period so that all ports are selected in n periods.

(23-3) When the information that the discovery process is in progress, and the GATE message detecting information are received from the section 21 after (23-2), the port k defined in (23-2) is input to the section 25.

(23-4) When the information that the discovery process is in progress, and the LLID_Reg is received from the section 21, the relationship between the port k, which is defined when the LLID is broadcast in (23-2), and the LLID_REG is created. Since the (23-2) changes the port number every discovery period, the LLID-port table of the relationship of all the port numbers and the LLID is created after n periods. The corresponding port number can be obtained when an LLID is provided from the table.

(23-5) The LLID is received from the section 20, the port number is defined based on the LLID from the LLID-port table created in (23-4) when the LLID is not for broadcast (i.e., when LLID is assigned to a certain ONU), and the relevant port number and the switch instruction "tgr" are input to the section 24.

(23-6) When receiving the information that the discovery process is not in progress, and the GATE message detecting information are received from the section 21 after (23-5), Tz is obtained based on the port number defined from LLID in (23-5) and the LLID from the LLID-Tz table created in (23-1), and the port number and the Tz are input to the section 25.

The section 24 receives the port number and the switch instruction "tgr" from the section 23, receives the downlink packet length from the section 20, and instructs the element 10 to establish the connection between an input port and an output port of the port number and keep the connection only for the time equal to the packet length.

The section 25 receives the type of GATE message from the section 21, receives the port number and Tz from the section 23, and instructs the element 11 to establish connection of an input port of the port number and an output port at the connection start time ts based on the time of the section 22 and keep the connection for the connection duration Td. The time ts and Td are defined as below from the transmission start time (Grant Start Time), t2, and the transmission duration (Grant Length) T2 of the GATE message.

(25-1) When the GATE message is for discovery, ts=t2, Td=Tdw (discovery window time: time set in advance depending on a system design). Thus, the REGISTER_REQ message from an ONU can be passed.

(25-2) When the GATE message is for ranging, ts=t2, Td=Trw (ranging window time: time set in advance depending on a system design). Thus, the REGISTER_ACK message from an ONU can be passed.

(25-3) When the GATE message is for transmission control, ts=t2+Tz, Td=T2. Thus, the packet transmitted by the ONU based on the GATE message can be passed.

The section 26 generates the packet instructed by the section 21, receives the time from the section 22, and transmits the uplink packet to the section 14 according to the transmission start time t2 and the transmission duration T2 from the section 21.

The multiplexing section 14 multiplexes the electrical signal from the section 40 and the electrical signal from the section 26, and inputs the signal to an electrical/optical conversion section (E/O) 15.

The electrical/optical conversion section 15 converts the electrical signal from the section 14 to an optical signal, and inputs the signal to the section 1.

The discovery operation of the optical switching device (OSM) of the present invention will be described below with reference to the sequence of FIG. 10. This sequence provides the timings for the connection start and the connection termination of the downlink optical switch element 10 and the uplink optical switch element 11 in the first to the sixth embodiments.

As shown in FIG. 10, for the downlink direction, when the packets are detected, the connection of the downlink optical switch element 10 is started in packet unit, and the connection is terminated after the downlink packet has passed. In this case, since the discovery GATE message, the REGISTER message, and the ranging GATE message are provided as the downlink packet in the discovery operation, connection establishment and connection termination are repeated every message.

With regards to the uplink direction, the REGISTER_REQ message and the REGISTER_ACK message must be passed in the discovery operation.

The REGISTER_REQ message passes the OSM between the transmission start time (Grant Start Time) td2 written on the discovery GATE message and the time td2+Tdw, where Tdw is the discovery window time, according to the clock of the OSM. Therefore, the OSM starts the connection at td2 at its clock and terminates the connection at td2+Tdw.

The REGISTSER_ACK message passes the OSM between the transmission start time (Grant Start Time) tr2 written on the ranging GATE message and the time tr2+Trw, where Trw is the ranging window time Trw, according to the clock of the OSM. Therefore, the OSM starts the connection at tr2 at its clock and terminates the connection at tr2+Trw.

With regards to the uplink direction, except the discovery operation, the LLID, the transmission start time (Grant Start Time) t2 and the transmission duration T2 written on the transmission control GATE message are acquired, the connection of the input port and the output port indicated by the port number corresponding to the LLID is started at time t2+Tz, and continued for T2. The establishment and the termination of connection for each message are sequentially performed for each ONU.

In the discovery operation in an ONU, the OSM may be adapted not to perform the discovery operation when obtaining the relationship between the port number of the OSM and the LLID of the ONU. That is, in terms of a system design, the LLID to be assigned to the OSM must be defined beforehand, and the OSM itself does not need to assign the LLID.

As another method, the OLT may perform the discovery operation. This discovery operation is done before the ONU does. In this case, when receiving the discovery GATE message, the OSM responds to the center device (OLT) with the REGISTER_REQ message, and then when receiving the REGISTER message from the center device (OLT), acquires the LLID from the message.

When the optical switch element (OSM) receives the ranging GATE message written on the LLID of the OSM, the OSM may match the time information (Time Stamp) written on the message with its clock, and respond to the center device (OLT) with the REGISER_ACK message only during the transmission duration T2 starting from the transmission start time t2 written on the message.

After the termination of the discovery, the round-trip time between the OSM and the OLT may be updated depending on cases. In other words, when the OSM receives the transmission control GATE message written on the LLID of the OSM, the time information (Time Stamp) t1 written on the message is matched with its clock, and a response may made to the center device (OLT) with the REPORT message only during the transmission duration T2 starting from the transmission start time t2 written on the message.

A method of transferring the round-trip time Tz from the OLT to the OSM may be applicable to the first to third embodiments. That is, a region for transferring Tz may be saved in the transmission control GATE message, and Tz may be transferred using the region. The OSM acquires Tz every time the transmission control GATE message is detected. According to such method, a new frame does not need to be defined. Furthermore, the value of Tz may be updated every time the transmission control GATE message is received. Such process corresponds to the process (21-3) of the section 21 in the second and the third embodiments.

The above-described embodiments are preferred embodiments for performing the optical switching device and the like, but should not be construed as being limited thereto. Therefore, various modifications may be made within the scope of not changing the content of the present invention.

It should be apparent to those skilled in the art that the present invention may be embodied in many other specific forms without departing from the spirit or scope of the invention. Therefore, the present invention is not to be limited to the details given herein, but may be modified within the scope and equivalence of the appended claims.

What is claimed is:

1. An optical switching device including a downlink optical switch section for switching a downlink signal sent from a center device, and an uplink optical switch section for switching an uplink optical signal sent from a plurality of remote devices, the optical switching device comprising:
   a first optical/electrical conversion section for converting the downlink optical signal sent from the center device to a first electrical signal;
   a first electrical/optical section for converting the first electrical signal to a downlink optical signal, and inputting the downlink optical signal to the downlink optical switch section;
   a branching section arranged between the first optical/electrical conversion section and the first electrical/optical section for converting, the branching section being configured to branch the first electrical signal and input a part of the first electrical signal into a control section configured to control the downlink optical switch section;
   a second optical/electrical conversion section for converting the uplink optical signal output from the uplink optical switch section to a second electrical signal; and
   a second electrical/optical section for converting the second electrical signal to an uplink optical signal, and sending the uplink optical signal to the center device.

2. The optical switching device according to claim 1, wherein a downlink packet is extracted from the first electrical signal, and control of the downlink optical switch section is performed according to a length of the downlink packet and an address of the downlink packet.

3. The optical switching device according to claim 1, wherein a downlink packet is extracted from the first electrical signal, and a message directed from the center device to the remote device in the downlink packet is analyzed to perform control of switching of the uplink optical switch section.

4. The optical switching device according to claim 1, wherein a downlink packet is extracted from the first electrical signal, and a message directed from the center device to the remote device in the downlink packet is analyzed to generate an uplink packet and multiplex the electrical signal related to the uplink packet with the second electrical signal.

5. The optical switching device according to claim 1, further comprising a first clock conversion section for changing a clock of the first electrical signal to a clock of the optical switching device.

6. The optical switching device according to claim 5, further comprising a second clock conversion section for changing a clock of the second electrical signal to a clock of the optical switching device.

7. The optical switching device according to claim 1, wherein an uplink packet is extracted from the second electrical signal, and the message directed from the center device to the remote device in the uplink packet is analyzed to perform control of switching of the uplink optical switch section.

8. The optical switching device according to claim 1, wherein an uplink packet is extracted from the second electrical signal, an arrival time of the uplink packet is measured, a message from the remote device to the center device in the uplink packet is analyzed, and a round-trip time between the optical switching device and the remote device transmitting the uplink packet is obtained to perform control of switching of the uplink optical switch section.

9. The optical switching device according to claim 1, wherein: when a packet with a broadcast LLID (Logical Link Identifier) is detected from the center device whilst an LLID of the optical switching device exists, one port of the downlink switch section is selected, connection is established only for the length of the packet for the packet to pass; when the packet is a discovery GATE message, a port of the same number as the port of the downlink switch section is selected at the uplink switch section, connection is established for the uplink switch section at a transmission start time written on the discovery GATE message, the connection is continued for a predetermined time to pass a REGISER_REQ message sent from the remote device connected to the port.

10. The optical switching device according to claim 1, wherein: when a packet with a broadcast LLID is detected from the center device after a discovery GATE message, a same port number as a port number passing the discovery GATE message is selected, connection is established only for the length of the packet in a downlink switch section to pass the packet; where when a packet is a REGISTER message, an LLID assigned to the remote device connected to the port is obtained from an information region of the REGISETR message, and the LLID and the port number are associated.

11. The optical switching device according to claim 10, wherein a port number to be selected is changed every time the broadcast LLID of the discovery GATE message is detected, and a relationship between all the port numbers and LLIDs corresponding to the remote devices connected to the ports is defined.

12. The optical switching device according to claim 1, wherein when a ranging GATE message having an LLID different from an LLID of the optical switching device is detected from the center device, a port of the uplink switch section is defined from the LLID, connection of the uplink switch section is established at the transmission start time written on the ranging GATE message, the connection is continued for a predetermined time, and a REGISTER_ACK message is passed from the remote device connected to the port.

13. The optical switching device according to claim 1, wherein: when a packet having an LLID that is different from an LLID of the optical switching device and is not a broadcast type is detected from the center device, a port of the downlink switch section is defined from the LLID, connection is established only for the length of the packet for the packet to pass; when the packet is a transmission control GATE message, a transmissions start time and a transmission duration are obtained from an information region of the message, a port of uplink switch section is defined from the LLID, connection is established at a time obtained by adding a round-trip time between the remote device corresponding to the LLID and the optical switching device to the transmission start time with respect to the uplink switch section, and the connection is continued only for the transmission duration.

14. The optical switching device according to claim 1, an LLID defined in advance is used as the LLID assigned to the optical switching device.

15. The optical switching device according to claim 1, wherein when a discovery GATE message is detected from the center device and the LLID of the optical switching device does not exist, a response is made to the center device with a REGISTER_REQ message, and an LLID is obtained from the REGISTER message when the REGISER message is detected from the center device.

16. The optical switching device according to claim 1, wherein when a ranging GATE message having a same LLID as an LLID of the optical switching device is detected, a response is made to the center device with a REGISER_ACK message based on information written on the ranging GATE message.

17. The optical switching device according to claim 1, wherein when a transmission control GATE message having a same LLID as an LLID of the optical switching device is detected, a response is made to the center device with a REPORT message based on information written on the transmission control GATE message.

18. The optical switching device according to claim 1, further comprising a delay section arranged between the branching section and the first electrical/optical converting section.

19. An optical access network comprising:
a center device;
a plurality of remote devices; and
an optical switching device for performing switching of a downlink optical signal sent by the center device and switching of an uplink optical signal sent by the remote device;
wherein in the optical switching device,
the downlink optical signal sent by the center device is converted to a first electrical signal, the first electrical signal is branched by a branching section such that a part of the first electrical signal is input to a control section configured to control a downlink optical switch section, the downlink optical signal being input to the downlink optical switch section, the first electrical signal is converted to a downlink optical signal and switching of the downlink optical signal is performed; and
the switching of the uplink optical signal sent by the remote device is performed, the output uplink optical signal is converted to a second electrical signal, and the second electrical signal is converted to an uplink optical signal and sent to the center device.

20. The optical access network according to claim 19, further comprising a delay section arranged between the branching section and a first electrical/optical converting section.

21. A computer program for an optical switching device comprising a downlink optical switch section for switching a downlink optical signal sent by a center device and an uplink optical switch section for switching an uplink optical signal sent by a plurality of remote devices, the program causing the optical switching device to execute:
converting the downlink optical signal sent by the center device to a first electrical signal;
branching the electrical signal such that part of the electrical signal is input into a control section configured to control the downlink optical switch section;
converting the first electrical signal to a downlink optical signal, and inputting the downlink optical signal to the downlink optical switch section;
converting the uplink optical signal output from the uplink optical switch section to a second electrical signal; and
converting the second electrical signal to an uplink optical signal, and sending the uplink optical signal to the center device,
wherein the computer program is present in a computer-readable medium.

22. The computer program according to claim 21, wherein there is a delay between the branching and the converting the electrical signal to the downlink optical signal.

\* \* \* \* \*